(12) United States Patent
Butler et al.

(10) Patent No.: US 11,352,073 B2
(45) Date of Patent: Jun. 7, 2022

(54) AERODYNAMIC TOOLBOX ASSEMBLY

(71) Applicant: FLOWBELOW AERO, INC., Austin, TX (US)

(72) Inventors: Joshua Butler, Austin, TX (US); Chris McKulsky, Austin, TX (US)

(73) Assignee: FLOWBELOW AERO, INC., Round Rock, TX (US)

( * ) Notice: Subject to any disclaimer, the term of this patent is extended or adjusted under 35 U.S.C. 154(b) by 276 days.

(21) Appl. No.: 16/630,318

(22) PCT Filed: Jul. 12, 2018

(86) PCT No.: PCT/US2018/041907
§ 371 (c)(1),
(2) Date: Jan. 10, 2020

(87) PCT Pub. No.: WO2019/014503
PCT Pub. Date: Jan. 17, 2019

(65) Prior Publication Data
US 2020/0164933 A1   May 28, 2020

Related U.S. Application Data

(60) Provisional application No. 62/531,782, filed on Jul. 12, 2017.

(51) Int. Cl.
*B62D 35/00* (2006.01)
*B60R 9/02* (2006.01)

(52) U.S. Cl.
CPC .............. *B62D 35/001* (2013.01); *B60R 9/02* (2013.01)

(58) Field of Classification Search
CPC ........ B62D 35/001; B62D 35/00; B60R 9/02; B60R 9/00
See application file for complete search history.

(56) References Cited

U.S. PATENT DOCUMENTS

| | | |
|---|---|---|
| 1,072,907 A | 9/1913 | Brooks |
| 1,173,434 A | 2/1916 | Johnson |
| 1,827,662 A | 10/1931 | Maas |
| 2,059,045 A | 10/1936 | Seymour |
| 2,190,117 A | 3/1939 | Griffith |
| 2,538,839 A | 1/1951 | Limberg |
| 2,579,048 A | 12/1951 | Paul |

(Continued)

FOREIGN PATENT DOCUMENTS

| | | | |
|---|---|---|---|
| DE | 102010063263 A1 * | 6/2012 | ......... B60R 13/0861 |
| EP | 542728 | 7/1988 | |

(Continued)

OTHER PUBLICATIONS

European Search Report issued for European Patent Application No. 18832450.3, dated Mar. 10, 2021, 7 pages.

(Continued)

*Primary Examiner* — Lori L Lyjak
(74) *Attorney, Agent, or Firm* — Sprinkle IP Law Group

(57) ABSTRACT

Embodiments provide an aerodynamic toolbox assembly comprising a toolbox coupled to a tractor trailer and an aerodynamic fairing assembly coupled to the toolbox. At least one fairing component extends beyond a selected surface of the toolbox to facilitate aerodynamic air flow past the toolbox during normal operation of the trailer.

15 Claims, 41 Drawing Sheets

(56) References Cited

U.S. PATENT DOCUMENTS

| | | |
|---|---|---|
| 2,605,119 A | 7/1952 | Earnest |
| 2,715,430 A | 8/1952 | Lindeman |
| 2,685,906 A | 8/1954 | Williams |
| 2,931,414 A | 4/1956 | Jankowski |
| 2,801,867 A | 8/1957 | Childreth |
| 2,869,929 A | 1/1959 | Hurd |
| 3,006,658 A | 10/1961 | Wenham et al. |
| 3,078,124 A | 2/1963 | Mulder |
| 3,092,420 A | 6/1963 | Baldwin et al. |
| 3,215,384 A | 11/1965 | Chambers |
| 3,276,502 A | 10/1966 | Walter |
| 3,276,503 A | 10/1966 | Kilmarx |
| 3,279,815 A | 10/1966 | Hutchens |
| 3,317,247 A | 5/1967 | Lamme |
| 3,350,113 A | 10/1967 | Graham |
| 3,367,722 A | 2/1968 | Miyanaga |
| 3,401,953 A | 9/1968 | Prohl |
| 3,582,108 A | 6/1971 | Carlton |
| 3,585,824 A | 6/1971 | Schenk et al. |
| 3,653,455 A | 4/1972 | Hetteen |
| 3,752,498 A | 8/1973 | Shea |
| 3,874,697 A | 4/1975 | Thompson |
| 3,918,764 A | 11/1975 | Lamme |
| 3,947,065 A | 3/1976 | Geiger |
| 3,954,281 A | 5/1976 | Juergens |
| 4,007,944 A | 2/1977 | Dingess |
| 4,138,129 A | 2/1979 | Morris |
| 4,169,608 A | 10/1979 | Logan |
| 4,180,230 A | 12/1979 | Sogoian |
| 4,205,861 A | 6/1980 | Roberts |
| 4,235,476 A | 11/1980 | Arvidsson |
| 4,334,694 A | 6/1982 | Iwanicki |
| 4,441,539 A | 4/1984 | Hulse |
| 4,582,107 A | 4/1986 | Scully |
| 4,619,303 A | 10/1986 | Bryan et al. |
| 4,627,631 A | 12/1986 | Sherman |
| 4,640,331 A | 2/1987 | Braun et al. |
| 4,641,698 A | 2/1987 | Bitoni |
| 4,678,017 A | 7/1987 | Schultz |
| 4,706,980 A | 11/1987 | Hawes et al. |
| 4,724,879 A | 2/1988 | Schultz et al. |
| 4,730,952 A | 3/1988 | Wiley |
| 4,735,428 A | 4/1988 | Antekeier |
| 4,744,399 A | 5/1988 | Magnuson et al. |
| 4,754,792 A | 7/1988 | Braun et al. |
| 4,761,040 A | 8/1988 | Johnson |
| 4,770,330 A | 9/1988 | Bonstead et al. |
| 4,784,430 A | 11/1988 | Biermacher |
| 4,836,568 A | 6/1989 | Preslik et al. |
| 4,860,579 A | 8/1989 | Beverly |
| 4,889,394 A | 12/1989 | Ruspa |
| 4,892,128 A | 1/1990 | Bartos |
| 4,895,199 A | 1/1990 | Magnuson et al. |
| 4,921,276 A | 5/1990 | Morin |
| 4,925,235 A | 5/1990 | Fingerle |
| 4,960,294 A | 10/1990 | Leonard |
| 4,961,611 A | 10/1990 | Patti |
| D312,609 S | 12/1990 | Preslik et al. |
| D312,810 S | 12/1990 | Preslik et al. |
| 4,974,909 A | 12/1990 | Patti et al. |
| 4,981,162 A | 1/1991 | Grenie |
| 4,984,851 A | 1/1991 | Hayano |
| 5,074,573 A | 12/1991 | Dick |
| 5,179,981 A | 1/1993 | Hickes et al. |
| 5,190,354 A | 3/1993 | Levy et al. |
| 5,192,108 A | 3/1993 | Richardson et al. |
| 5,238,268 A | 8/1993 | Logan |
| 5,240,039 A | 8/1993 | Colussi et al. |
| 5,257,822 A | 11/1993 | Metcalf |
| 5,263,770 A | 11/1993 | Goudey |
| 5,269,547 A | 12/1993 | Antekeier |
| 5,280,990 A | 1/1994 | Rinard |
| 5,286,049 A | 2/1994 | Khan |
| D345,332 S | 3/1994 | Roman |
| 5,294,189 A | 3/1994 | Price et al. |
| 5,324,099 A | 6/1994 | Fitzhugh |
| 5,332,280 A | 7/1994 | DuPont et al. |
| 5,340,154 A | 8/1994 | Scott |
| 5,358,313 A | 10/1994 | Polka |
| 5,366,278 A | 11/1994 | Brumfield |
| 5,375,882 A | 12/1994 | Koch, III |
| 5,380,028 A | 1/1995 | Ferris |
| 5,398,743 A | 3/1995 | Bartos |
| D361,974 S | 9/1995 | Hornik |
| 5,465,772 A | 11/1995 | Sartor |
| 5,490,342 A | 2/1996 | Rutterman et al. |
| 5,538,062 A | 7/1996 | Stech |
| 5,584,949 A | 12/1996 | Ingram |
| 5,623,777 A | 4/1997 | Hsiao et al. |
| D381,949 S | 8/1997 | Barrett, Jr. et al. |
| 5,659,989 A | 8/1997 | Hsiao et al. |
| D395,268 S | 6/1998 | Tucker |
| 5,769,979 A | 6/1998 | Naedler |
| 5,791,741 A | 8/1998 | Sheu |
| 5,833,254 A | 11/1998 | Bucho |
| 5,836,399 A | 11/1998 | Maiwald et al. |
| 5,850,727 A | 12/1998 | Fox |
| 5,871,335 A | 2/1999 | Bartlett |
| 5,884,981 A | 3/1999 | Ichikawa |
| 5,938,222 A | 8/1999 | Huang |
| 5,947,520 A | 9/1999 | McHorse |
| 6,045,195 A | 4/2000 | Okamoto |
| 6,070,893 A | 6/2000 | Thorndyke et al. |
| 6,070,908 A | 6/2000 | Skrzypchak |
| 6,105,645 A | 8/2000 | Ingram |
| 6,120,104 A | 9/2000 | Okamoto et al. |
| 6,152,469 A | 11/2000 | Gadowski |
| 6,219,987 B1 | 4/2001 | Trent et al. |
| 6,244,316 B1 | 6/2001 | Naedler |
| 6,367,841 B1 | 4/2002 | Matthew |
| 6,401,743 B1 | 6/2002 | Naedler |
| 6,412,799 B1 | 7/2002 | Schrempf |
| 6,416,112 B1 | 7/2002 | Trivits |
| 6,427,739 B1 | 8/2002 | Medsker |
| 6,431,605 B1 | 8/2002 | Miller et al. |
| 6,435,462 B2 | 8/2002 | Hawes |
| 6,443,492 B1 | 9/2002 | Barr et al. |
| 6,443,529 B1 | 9/2002 | Williams |
| 6,604,724 B2 | 8/2003 | Hawes |
| 6,648,373 B2 | 11/2003 | Hawes |
| 6,666,498 B1 | 12/2003 | Whitten |
| 6,698,482 B2 | 3/2004 | Hennig |
| 6,786,512 B2 | 9/2004 | Morin et al. |
| 6,857,709 B1 | 2/2005 | McLean et al. |
| 6,886,862 B2 | 5/2005 | Matthew |
| 6,979,050 B2 | 12/2005 | Browne et al. |
| 7,011,428 B1 | 3/2006 | Hand |
| 7,081,081 B2 | 7/2006 | Schutz et al. |
| 7,083,179 B2 | 8/2006 | Chapman et al. |
| 7,093,909 B1 | 8/2006 | Korpi et al. |
| 7,131,705 B1 | 11/2006 | DelVecchio et al. |
| 7,249,804 B2 | 7/2007 | Zank et al. |
| 7,466,049 B1 | 12/2008 | Vancea |
| 7,484,736 B2 | 2/2009 | Allemann et al. |
| 7,520,534 B2 | 4/2009 | Longchamp |
| 7,530,379 B1 | 5/2009 | Becker et al. |
| 7,547,076 B2 | 6/2009 | Necaise |
| D607,200 S | 1/2010 | Prater |
| 7,651,108 B2 | 1/2010 | Bonnaud et al. |
| 7,658,251 B2 | 2/2010 | James |
| 7,669,678 B2 | 3/2010 | Benedict et al. |
| 7,775,374 B1 | 8/2010 | Barker et al. |
| 7,775,604 B2 | 8/2010 | Chen |
| 7,806,464 B2 | 10/2010 | Cardolle |
| 7,909,343 B2 | 3/2011 | Archer et al. |
| 7,931,302 B2 | 4/2011 | Vaughn |
| 7,963,159 B2 | 6/2011 | Ingram et al. |
| 7,975,739 B1 | 7/2011 | Ingram |
| 8,011,848 B2 | 9/2011 | Sockman et al. |
| 8,028,732 B1 | 10/2011 | Ingram et al. |
| 8,118,329 B2 | 2/2012 | Braga |
| 8,251,436 B2 | 8/2012 | Henderson et al. |
| 8,342,595 B2 | 1/2013 | Henderon et al. |
| 8,353,375 B2 | 1/2013 | James |

(56) References Cited

U.S. PATENT DOCUMENTS

| | | | |
|---|---|---|---|
| 8,382,210 B1 | 2/2013 | Fleck | |
| 8,424,956 B2 | 4/2013 | Stimel | |
| 8,517,474 B2 | 8/2013 | Salah | |
| 8,540,304 B2 | 9/2013 | Kint | |
| 8,567,802 B2 | 10/2013 | Barron | |
| 8,573,671 B2* | 11/2013 | Watkins | B60R 11/06 296/37.8 |
| 8,726,958 B2 | 5/2014 | Merrill | |
| 8,746,305 B2 | 6/2014 | Lloyd | |
| 8,747,084 B2 | 6/2014 | Richardson et al. | |
| 8,763,661 B2 | 7/2014 | Richardson | |
| 8,814,253 B1 | 8/2014 | Butler et al. | |
| 8,870,275 B1 | 10/2014 | Schmidt | |
| 8,955,626 B2 | 2/2015 | Trueman | |
| 9,027,983 B2 | 5/2015 | Butler et al. | |
| 9,039,386 B2 | 5/2015 | Rcihardson et al. | |
| 9,039,392 B2 | 5/2015 | Richardson et al. | |
| 9,074,595 B2 | 7/2015 | Richardson | |
| 9,080,565 B2 | 7/2015 | Richardson | |
| 9,121,401 B2 | 9/2015 | Richardson | |
| 9,145,887 B2 | 9/2015 | Richardson | |
| 9,151,288 B2 | 10/2015 | Richardson | |
| 9,222,473 B2 | 12/2015 | Richardson | |
| 9,308,949 B1 | 4/2016 | Mihelic et al. | |
| 9,321,302 B2 | 4/2016 | Fleck | |
| 9,327,550 B2 | 5/2016 | Butler et al. | |
| 9,429,243 B2 | 8/2016 | Hessling et al. | |
| 9,604,157 B2 | 3/2017 | Richardson | |
| 9,637,184 B1 | 5/2017 | Bennett | |
| 9,663,157 B2 | 5/2017 | Butler et al. | |
| 9,815,506 B2 | 11/2017 | Vogel et al. | |
| 9,821,598 B2 | 11/2017 | Fleck | |
| 9,868,318 B2 | 1/2018 | Becker | |
| 10,252,755 B2 | 4/2019 | Butler et al. | |
| 10,293,872 B2 | 5/2019 | Butler et al. | |
| 10,343,450 B2 | 7/2019 | Butler et al. | |
| 10,482,565 B1 | 11/2019 | Chen | |
| 10,654,529 B2 | 5/2020 | Butler | |
| 10,710,649 B2 | 7/2020 | Butler et al. | |
| 10,882,571 B2 | 1/2021 | Butler | |
| 11,110,974 B2 | 9/2021 | Cosme | |
| 11,220,132 B2 | 1/2022 | Butler | |
| 11,254,373 B2 | 2/2022 | Butler | |
| 11,273,877 B2 | 3/2022 | Butler | |
| 2002/0124926 A1 | 9/2002 | Colussi et al. | |
| 2004/0164539 A1 | 8/2004 | Bernard | |
| 2004/0238093 A1 | 12/2004 | Nelson et al. | |
| 2005/0133134 A1 | 6/2005 | Ingram et al. | |
| 2005/0146151 A1* | 7/2005 | Walker | B60R 11/02 296/37.6 |
| 2006/0179929 A1 | 8/2006 | Becker | |
| 2008/0257620 A1 | 10/2008 | Poulsen | |
| 2009/0273176 A1 | 11/2009 | Ulgen | |
| 2009/0283190 A1 | 11/2009 | Padula et al. | |
| 2010/0066123 A1 | 3/2010 | Ortega et al. | |
| 2010/0066155 A1 | 3/2010 | Seradarian et al. | |
| 2010/0117396 A1 | 5/2010 | Dayton | |
| 2011/0011656 A1 | 1/2011 | Poulsen | |
| 2011/0057410 A1 | 3/2011 | Eklund et al. | |
| 2011/0089748 A1 | 4/2011 | Grill et al. | |
| 2011/0101767 A1 | 5/2011 | Fleck | |
| 2011/0253851 A1 | 10/2011 | Di Franco | |
| 2011/0272963 A1 | 11/2011 | Henderson et al. | |
| 2011/0272964 A1 | 11/2011 | Henderson et al. | |
| 2011/0284602 A1* | 11/2011 | Lamouroux | B60R 11/06 224/402 |
| 2012/0013146 A1 | 1/2012 | Wolf et al. | |
| 2012/0024445 A1 | 2/2012 | Wilson et al. | |
| 2012/0043803 A1 | 2/2012 | Grill | |
| 2012/0256438 A1* | 10/2012 | Watkins | B60R 11/06 296/37.6 |
| 2013/0049320 A1 | 2/2013 | Smith | |
| 2013/0068361 A1 | 3/2013 | Flory et al. | |
| 2013/0076107 A1 | 3/2013 | Starnes | |
| 2013/0087262 A1 | 4/2013 | Hennig | |
| 2013/0199685 A1 | 8/2013 | Nelson et al. | |
| 2014/0284994 A1 | 9/2014 | Polka | |
| 2015/0059946 A1 | 3/2015 | Keeney | |
| 2015/0151569 A1 | 6/2015 | Fleck | |
| 2015/0175089 A1* | 6/2015 | Reed, III | B60R 11/06 224/404 |
| 2015/0321336 A1* | 11/2015 | Harrison | B65D 51/24 206/349 |
| 2015/0329152 A1 | 11/2015 | Baker et al. | |
| 2016/0096557 A1 | 4/2016 | Bassily et al. | |
| 2016/0141934 A1 | 5/2016 | Click | |
| 2016/0221388 A1 | 8/2016 | Van Oort | |
| 2016/0288590 A1 | 10/2016 | Hennig et al. | |
| 2016/0368545 A1 | 12/2016 | Vogel et al. | |
| 2017/0029044 A1 | 2/2017 | Senatro | |
| 2017/0129549 A1 | 5/2017 | Polgrean | |
| 2017/0166266 A1 | 6/2017 | Wall, II | |
| 2017/0240220 A1 | 8/2017 | Kron et al. | |
| 2018/0072354 A1 | 3/2018 | Cosme et al. | |
| 2018/0104994 A1 | 4/2018 | Lin | |
| 2018/0370580 A1 | 12/2018 | Butler et al. | |
| 2019/0031251 A1 | 1/2019 | Butler et al. | |
| 2019/0061838 A1 | 2/2019 | Lee | |
| 2019/0152409 A1* | 5/2019 | Klatt | B60R 11/00 |
| 2019/0193797 A1 | 6/2019 | Butler et al. | |
| 2019/0270335 A1 | 9/2019 | Butler | |
| 2020/0047824 A1 | 2/2020 | Butler | |
| 2020/0062048 A1 | 2/2020 | Bulter | |
| 2020/0114983 A1 | 4/2020 | Cosme et al. | |
| 2020/0164933 A1 | 5/2020 | Butler et al. | |
| 2020/0262493 A1 | 8/2020 | Butler | |
| 2020/0339201 A1 | 10/2020 | Butler | |
| 2021/0009209 A1 | 1/2021 | Senatro | |
| 2021/0139086 A1 | 5/2021 | Andrus | |
| 2021/0197902 A1 | 7/2021 | Butler | |

FOREIGN PATENT DOCUMENTS

| | | |
|---|---|---|
| EP | 0309611 A1 | 4/1989 |
| EP | 0310130 A1 | 4/1989 |
| GB | 2348400 | 10/2000 |
| GB | 2524173 | 9/2016 |
| WO | WO 1997/48590 | 12/1997 |
| WO | WO9748590 | 12/1997 |
| WO | WO 2004/062953 | 7/2004 |
| WO | WO 2008/100338 | 8/2008 |
| WO | WO2009105623 | 8/2009 |
| WO | WO 2013/174410 | 11/2013 |
| WO | WO 2016/134847 | 9/2016 |
| WO | WO 2018/136529 | 7/2018 |

OTHER PUBLICATIONS

International Search Report and Written Opinion issued for International Application No. PCT/US18/41907, dated Dec. 20, 2018, 8 pages.

Bresnan, Exterior Accessories, Drink Water Trailer Sales, May 11, 2012, Pembroke, MA, retrieved from http://www.drinkwaterts.com on Jul. 25, 2012, 23 pgs.

Truck Accessories, Council Hitch Truck Accessories, Council Bluffs, IA, retrieved on Jul. 24, 2012 from <http://councilhitch.com/vehicle-accessories/truck-accessories/> 1 pg.

AMP Research PowerStep™, AMP Research, 2011, Tustin, CA, retrieved on Jul. 24, 2012 from <http://www.amp-research.com/products/truckaccessories/powerstep/>, 6 pgs.

TrailBack Aluminium Running Boards, BuyAutoTruckAccessories.com, 2012, Clifton, NJ, retrieved on Jul. 24, 2012, from <http://www.buyautotruckaccessories.com>, 2 pgs.

Discount Auto Parts Dee Zee Running Boards Car Truck SUV, Dee Zee, Inc., Des Moines, IA, retrieved on Jul. 24, 2012, from <http://www.running-board.nedona.org>, 6 pgs.

Lund Trailrunner Extruded Aluminum Running Boards, JC Whitney, 2012, LaSalle, IL, retrieved on Jul. 25, 2012, from <http://www.jcwhitney.com>, 3 pgs.

Endeavor Running Boards, 4WheelOnline.com, Tampa, FL, retrieved on Jul. 28, 2012, from <http://4wheelonline.com/EndeavourRunningBoards.64146>, 2 pgs.

(56) References Cited

OTHER PUBLICATIONS

Deflecktor®, The First-Of-Its-Kind Aerodynamic Wheel Cover, A de F, Ltd., Birchwood, MN, retrieved from http://www.deflecktor.com/DeflecktorBrochure.pdf, 15 pgs.
International Search Report and Written Opinion for PCT Application No. PCT/US2012/046010, completed Sep. 11, 2012 and dated Oct. 1, 2012, 10 pgs.
Office Action for U.S. Appl. No. 13/452,249, dated Apr. 19, 2013, 11 pgs.
Truck Accessories, Council Hitch Truck Accessories, Council Bluffs, IA, retrieved on May 15, 2013, from <http://councilhitch.com/vehicle-accessories/truck-accessories/>, 5 pgs.
Office Action for U.S. Appl. No. 13/452,249, dated Sep. 9, 2013, 9 pgs.
International Preliminary Report on Patentability (Ch. I) for International Application No. PCT/US2012/046010, dated Jan. 23, 2014, 9 pgs.
International Search Report and Written Opinion for International Patent Application No. PCT/US13/68119, dated Jun. 5, 2014, 10 pgs.
Isuzu NPR Splash Shield/Mud Flap 1989-Up, Busbee's Trucks & Parts Product Information Page, BusbeeTruckParts's Photostream, Flickr, uploaded Nov. 12, 2010, retrieved on Feb. 25, 2014, from <www.flickr.com/photos/busbeetruckparts/5169791014/in/photostream/>, 1 pg.
Office Action for U.S. Appl. No. 14/070,294, dated Sep. 17, 2014, 8 pgs.
Extended European Search Report for Application No. EP 12811575.5, dated Mar. 4, 2015, 8 pgs.
Office Action for U.S. Appl. No. 13/545,100, dated Apr. 10, 2015, 15 pgs.
International Preliminary Report on Patentability (Ch. I) for Application No. PCT/US2013/068119, dated May 14, 2015, 7 pgs.
Office Action for U.S. Appl. No. 13/545,100, dated Sep. 21, 2015, 8 pgs.
Office Action for U.S. Appl. No. 14/666,019, dated Jul. 8, 2016, 7 pgs.
Extended European Search Report for Application No. EP 13851505.1, dated Oct. 14, 2016, 8 pgs.
Examination Report for Australian Application No. 2013337652, dated Jan. 13, 2017, 4 pgs.
Office Action for U.S. Appl. No. 15/082,996, dated Apr. 3, 2018, 25 pgs.
Office Action for Canadian Application No. 2,877,482, dated May 14, 2018, 4 pgs.
Office Action for U.S. Appl. No. 15/491,477, dated Aug. 14, 2018, 7 pgs.
Office Action for U.S. Appl. No. 15/553,893, dated Jul. 19, 2018, 7 pgs.
Office Action for U.S. Appl. No. 16/018,413, dated Sep. 18, 2018, 6 pgs.
Office Action for U.S. Appl. No. 15/082,996, dated Nov. 2, 2018, 6 pgs.
Office Action for U.S. Appl. No. 15/553,893, dated Feb. 25, 2019, 6 pgs.
Office Action for U.S. Appl. No. 16/290,631, dated Jun. 25, 2019, 7 pgs.
Office Action for European Patent Application No. 12811575.5, dated Jun. 28, 2019, 6 pgs.
Vigia Tire Pressure Systems brochure, Colven, retrieved from <http://www.vigia.ca/images/Pdf/Vigia_external_brochure.pdf>, captured Nov. 5, 2017, 4 pgs.
Non-patent literature illustrating parts_hollow.jpg, Colven, retrieved from <http://vigia.ca/webshop/images/categories/parts_hollow.jpg>, captured Nov. 5, 2017, 1 pg.
International Search Report for PCT Application No. PCT/US17/60242, dated Mar. 1, 2018, 4 pgs.
Written Opinion for PCT Application No. PCT/US17/60242, dated Mar. 1, 2018, 6 pgs.
Office Action for U.S. Appl. No. 16/017,591, dated Sep. 4, 2019, 8 pgs.
Office Action for U.S. Appl. No. 16/290,631, dated Oct. 2, 2019, 9 pgs.
Office Action for U.S. Appl. No. 16/049,367, dated Dec. 12, 2019, 8 pgs.
European Office Action for Patent Application No. 12811575.5 dated May 18, 2020, 5 pgs.
European Partial Search Report for Patent Application No. 17866894.3 dated Jun. 12, 2020, 12 pgs.
European Office Action for Patent Application No. 13851505.1, dated Jun. 12, 2020, 5 pgs.
Office Action for Canadian Patent Application No. 2890183, dated Jun. 25, 2020, 4 pgs.
Office Action for U.S. Appl. No. 16/049,367, dated Jul. 23, 2020, 8 pgs.
Office Action for U.S. Appl. No. 15/553,893, dated Apr. 16, 2020, 8 pgs.
Office Action for U.S. Appl. No. 15/553,893, dated Aug. 31, 2020, 9 pgs.
Office Action for U.S. Appl. No. 16/710,623, dated Oct. 6, 2020, 8 pgs.
Extended European Search Report for Patent Application No. 17866894.3, dated Oct. 9, 2020, 11 pgs.
Office Action for U.S. Appl. No. 16/415,875, dated Jan. 15, 2021, 14 pgs.
Office Action for European Patent Application No. 13851505.1, dated Feb. 10, 2021, 4 pgs.
Fleet Engineers Product Catalog 2017, Mud Flap Brackets, at pp. 51-66, retrieved Jan. 12, 2021 at <<https://fleetengineers.s3.amazonaws.com/uploads/2017/10/FE2017-ProdCat-101317-web.pdf>>, 228 pgs.
Office Action for U.S. Appl. No. 16/415,875, dated May 24, 2021, 7 pgs.
Notice of Allowance for U.S. Appl. No. 16/657,824, dated Jul. 19, 2021, 6 pgs.
Notice of Allowance for U.S. Appl. No. 16/415,875, dated Aug. 5, 2021, 4 pgs.
Notice of Allowance for U.S. Appl. No. 16/858,521, dated Aug. 9, 2021, 6 pgs.
Notice of Allowance for U.S. Appl. No. 15/553,893 dated Aug. 3, 2021, 2 pgs.
Office Action for U.S. Patent No. U.S. Appl. No. 16/466,268, dated Sep. 20, 2021, 13 pgs.
Extended European Search Report for Patent Application No. 21171821.8, dated Oct. 4, 2021, 8 pgs.

* cited by examiner

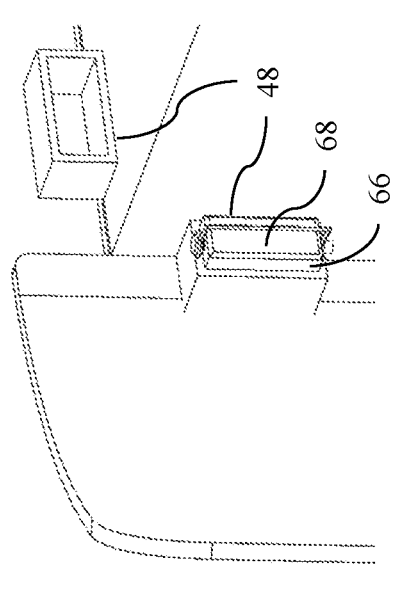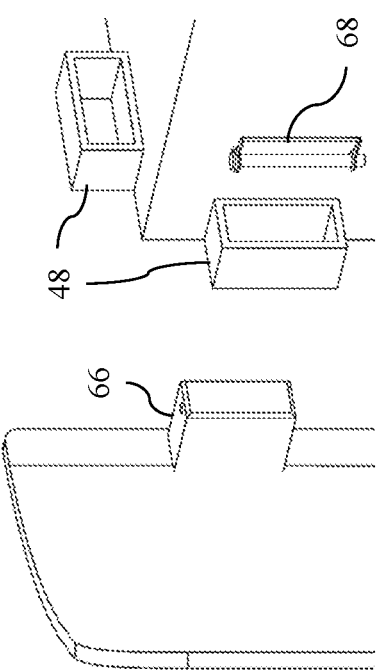

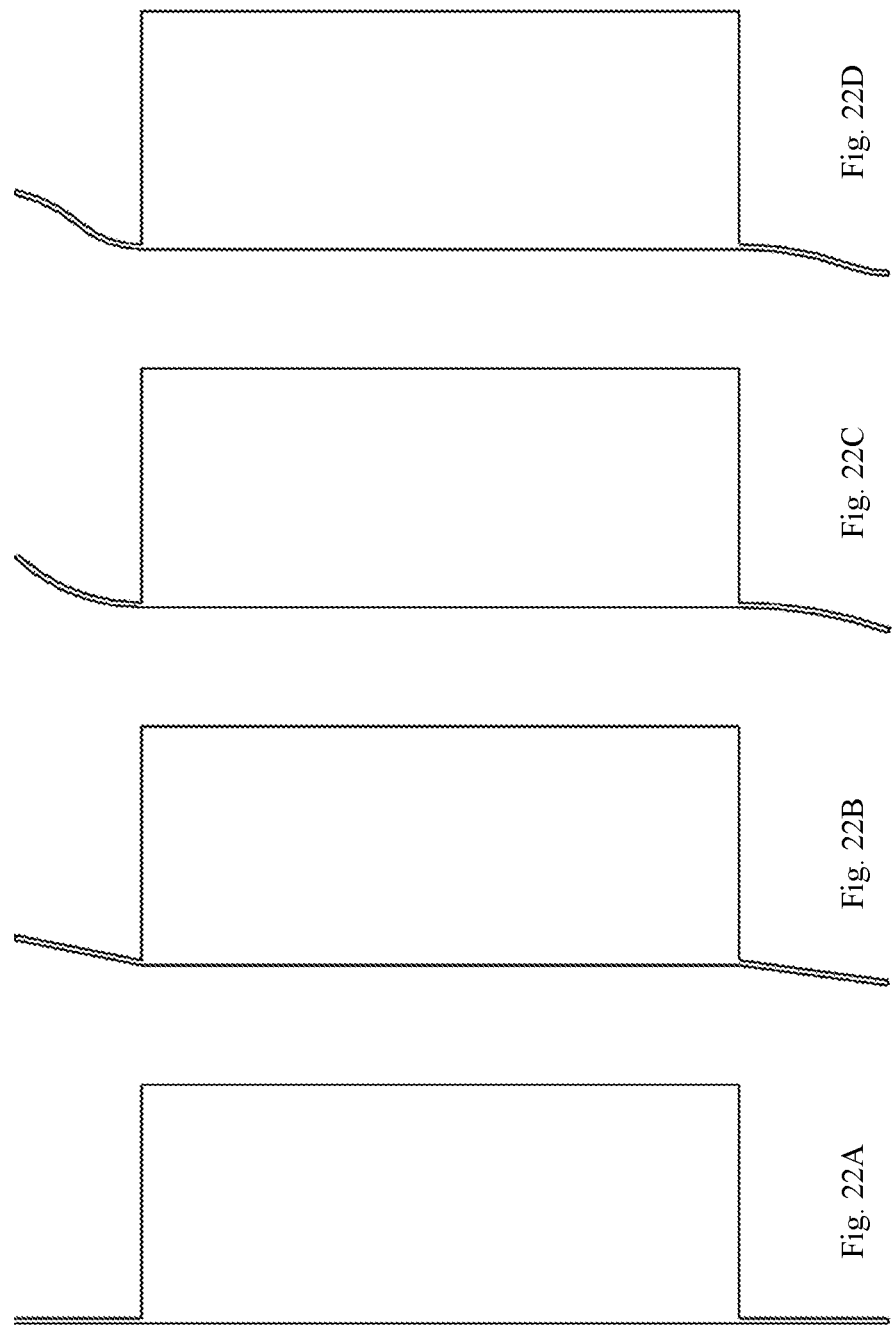

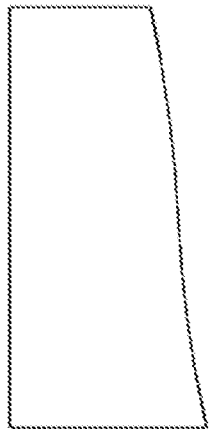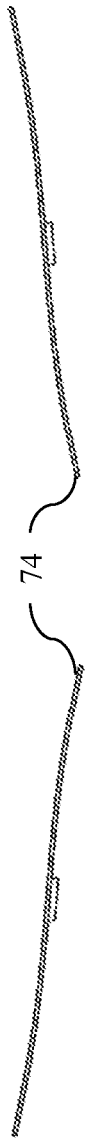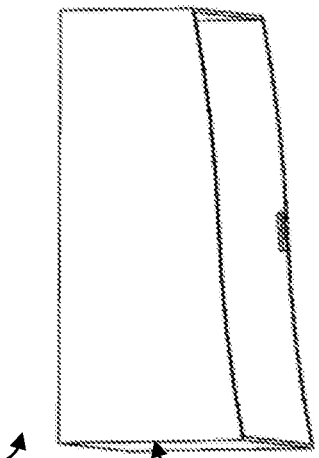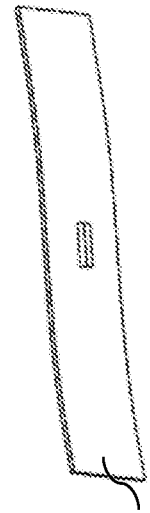
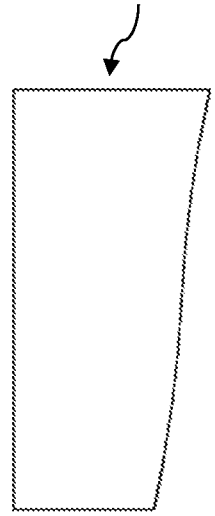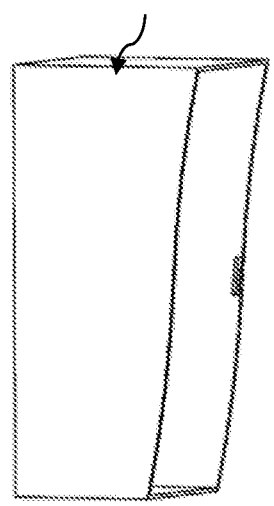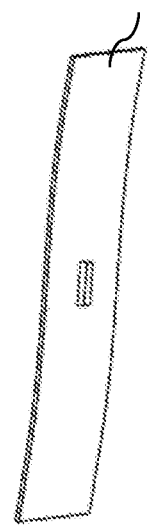
Fig. 23I  Fig. 23J  Fig. 23K  Fig. 23L

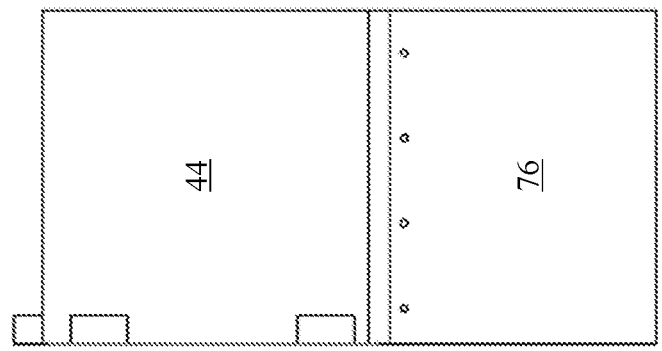
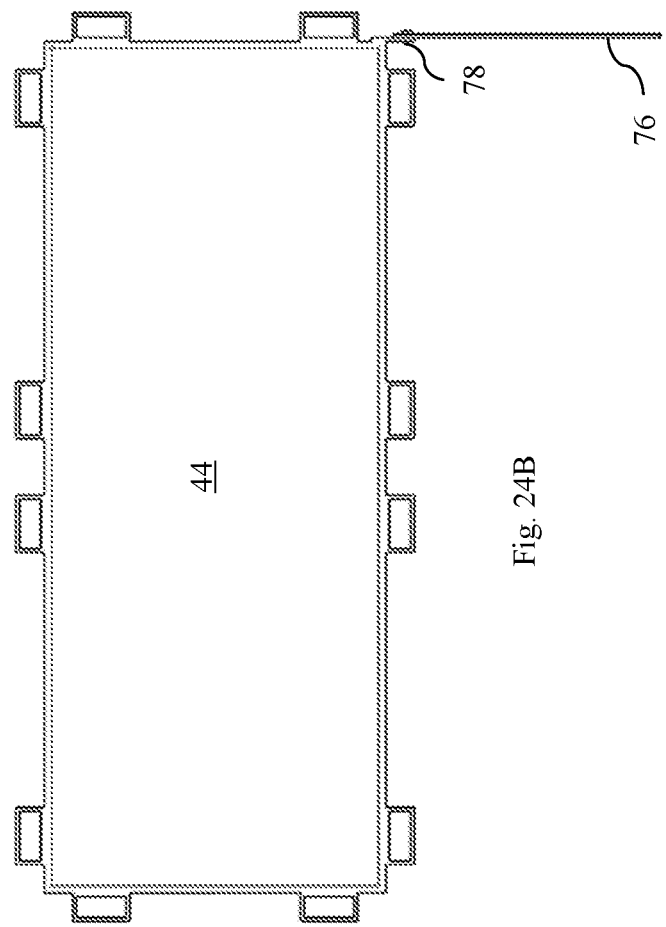

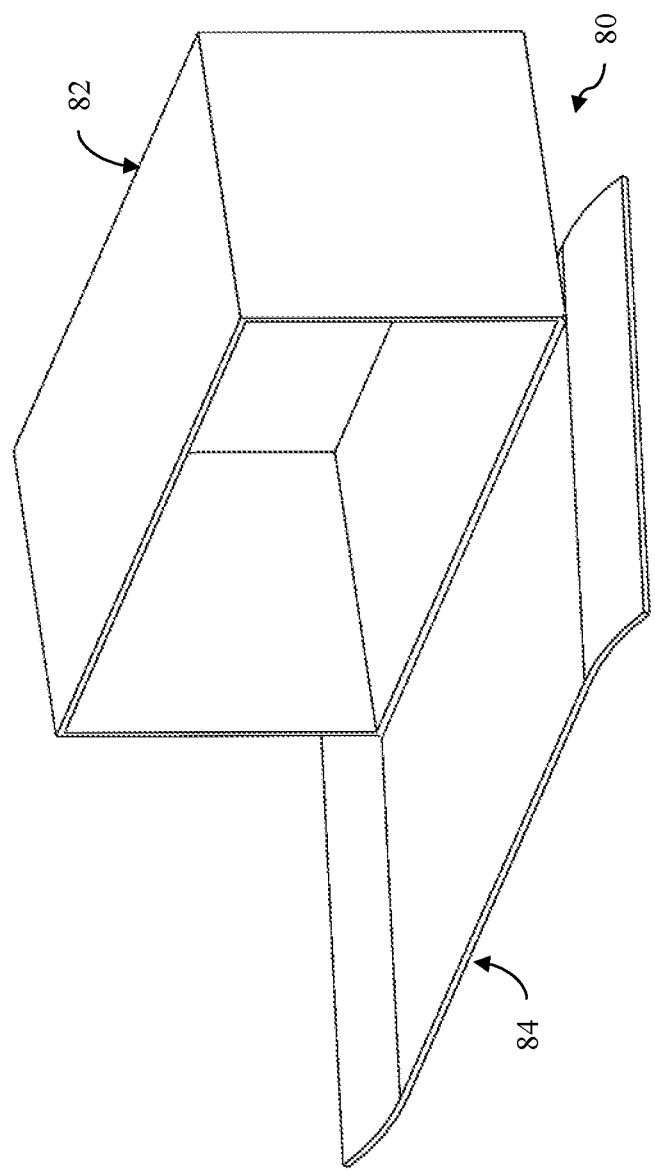

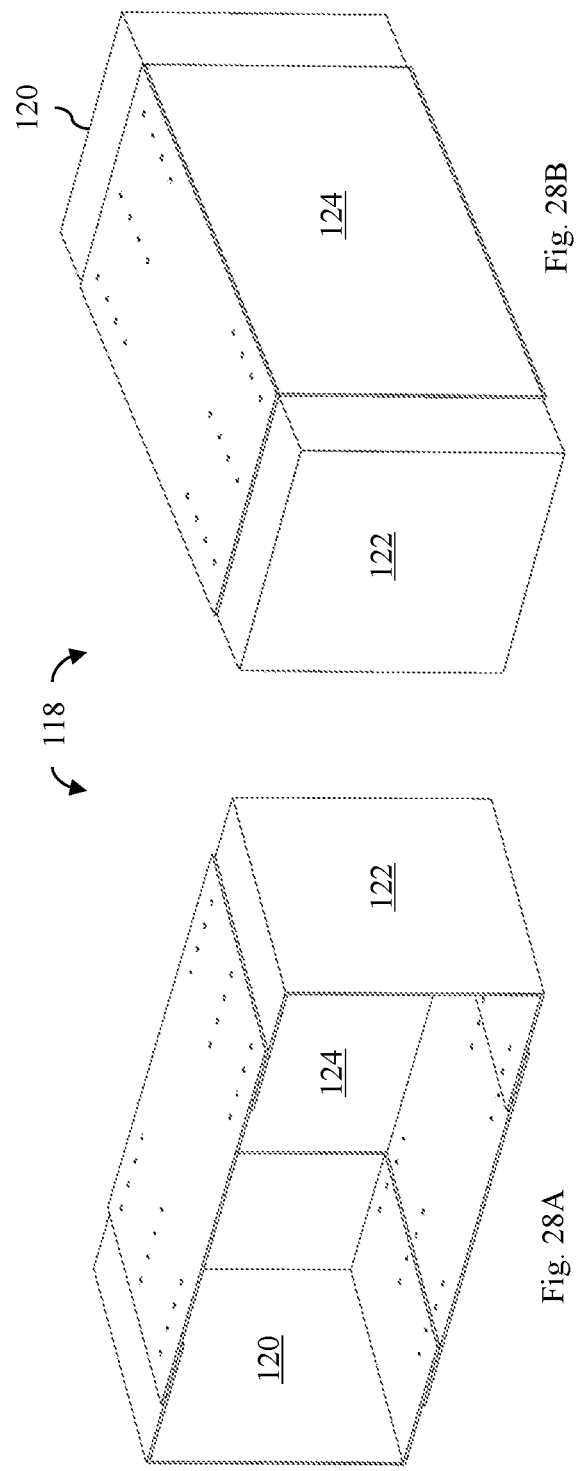

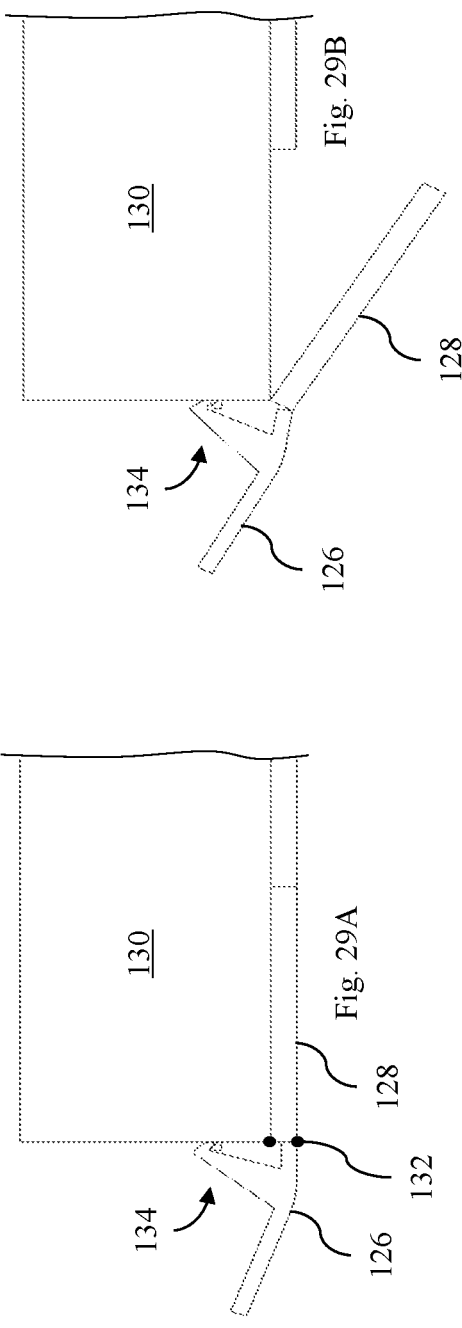

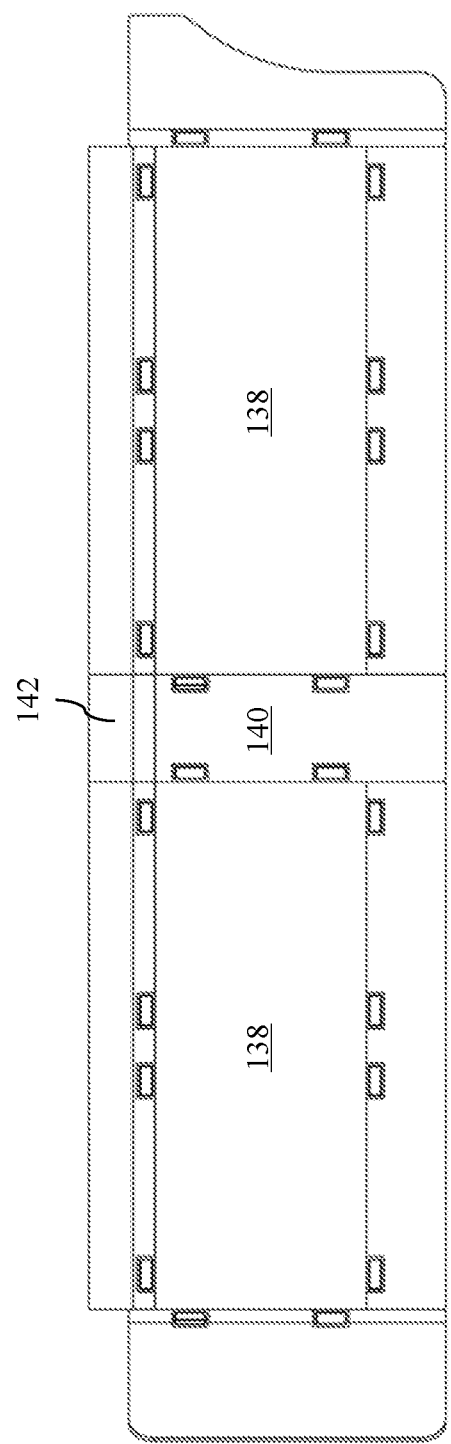

AERODYNAMIC TOOLBOX ASSEMBLY

CROSS-REFERENCE TO RELATED APPLICATIONS

This is a national stage application of and claims the benefit of priority to International Application No. PCT/US2018/041907, filed Jul. 12, 2018, entitled "AERODYNAMIC TOOLBOX ASSEMBLY," This application is related to U.S. Provisional Patent Application No. 62/531,782, filed 12 Jul. 2017 ("Parent Provisional"); and, pursuant to 37 CFR § 1.78(a)(4), hereby claims benefit under 35 USC 119(e) of the filing date thereof, the entire contents of which are hereby expressly incorporated herein by reference for all purposes.

BACKGROUND OF THE INVENTION

1. Field of the Invention

This invention relates to aerodynamic toolbox assemblies for vehicles.

2. Description of the Related Art

In general, in the descriptions that follow, we will italicize the first occurrence of each special term of art that should be familiar to those skilled in the art of vehicular fairing systems. In addition, when we first introduce a term that we believe to be new or that we will use in a context that we believe to be new, we will bold the term and provide the definition that we intend to apply to that term.

Hereinafter, when we refer to a facility we mean a mechanical, hydraulic, electrical or electronic device or an associated set of such devices adapted to perform a particular function regardless of the physical or circuit layout of an embodiment thereof. However, unless we expressly state to the contrary, we consider the form of instantation of any facility that practices our invention as being purely a matter of design choice.

Large vehicles such as semis may easily travel several thousand miles each month, including on highways and other routes which allow for higher speeds. Poor aerodynamics cause a decrease in fuel economy and an increase in operating cost. Therefore, there is a need to improve the aerodynamics of such vehicles, and, thus, the fuel efficiency thereof.

BRIEF SUMMARY OF THE INVENTION

Embodiments described herein provide systems and methods for improving the aerodynamics of toolboxes mounted on vehicles, and, in particular, tractor and trailer vehicles. Embodiments may also be beneficial on other vehicles as well.

In one embodiment, an aerodynamic fairing facility is provided for use with a vehicle-mounted toolbox comprising: a top panel; a bottom panel; a rear panel; a first side panel; and a second side panel. In this embodiment, the aerodynamic fairing facility comprises: a first fairing panel coupled to a selected one of the top panel, the bottom panel, the first side panel and the second side panel of the toolbox, the first fairing panel being configured so as to extend beyond a selected one of the top panel, the bottom panel, the first panel and the second panel of the toolbox.

BRIEF DESCRIPTION OF THE SEVERAL VIEWS OF THE DRAWINGS

For a more complete understanding of the present disclosure and the advantages thereof, reference is now made to the following description taken in conjunction with the accompanying drawings in which like reference numerals indicate like features and wherein:

FIG. 12, comprising FIG. 12A and FIG. 12B, depicts one embodiment of the socket attachments of the fairing components of FIG. 10;

FIG. 22, comprising FIG. 22A, FIG. 22B, FIG. 22C, FIG. 22D, FIG. 22E, FIG. 22F, FIG. 22G, FIG. 22H, FIG. 22I, FIG. 22J, FIG. 22K and FIG. 22L, depicts, in top plan view form, alternative embodiments of the embodiment of FIG. 10;

FIG. 23, comprising FIG. 23A through FIG. 23L, depicts a third embodiment of an aerodynamic toolbox;

FIG. 24, comprising FIG. 24A, FIG. 24B and FIG. 24C, depicts a fourth embodiment of a toolbox having a mud flap coupled thereto;

FIG. 25, comprising FIG. 25A, FIG. 25B, FIG. 25C and FIG. 25D, depicts a fifth embodiment of an aerodynamic toolbox;

FIG. 26, comprising

FIG. 27, comprising

FIG. 28, comprising FIG. 28A and FIG. 28B, depicts an eighth embodiment of an aerodynamic toolbox;

FIG. 29, comprising FIG. 29A, FIG. 29B, FIG. 29C and FIG. 29D, illustrates a method for pivotally coupling the front fairing to a door of an aerodynamic toolbox so as to allow rotation of the door beyond 90°;

FIG. 29A, FIG. 29B, FIG. 29C and FIG. 29D, depicts a ninth embodiment of an aerodynamic toolbox; and FIG. 31 depicts a tenth embodiment of an aerodynamic toolbox.

Figure 1:
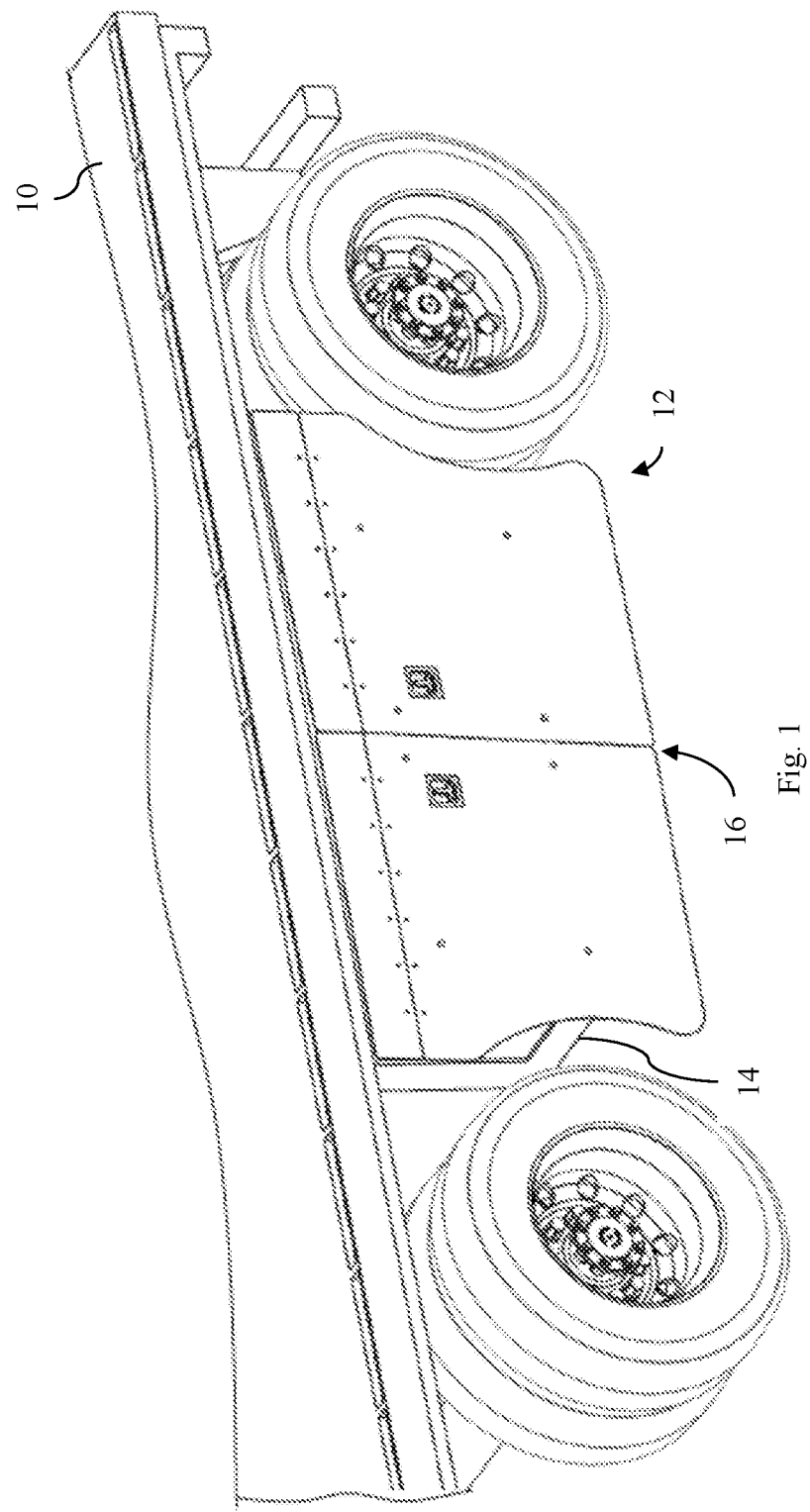
FIG. 1 depicts a perspective view of one embodiment of an aerodynamic toolbox assembly mounted under a tractor trailer.
Figure 2:
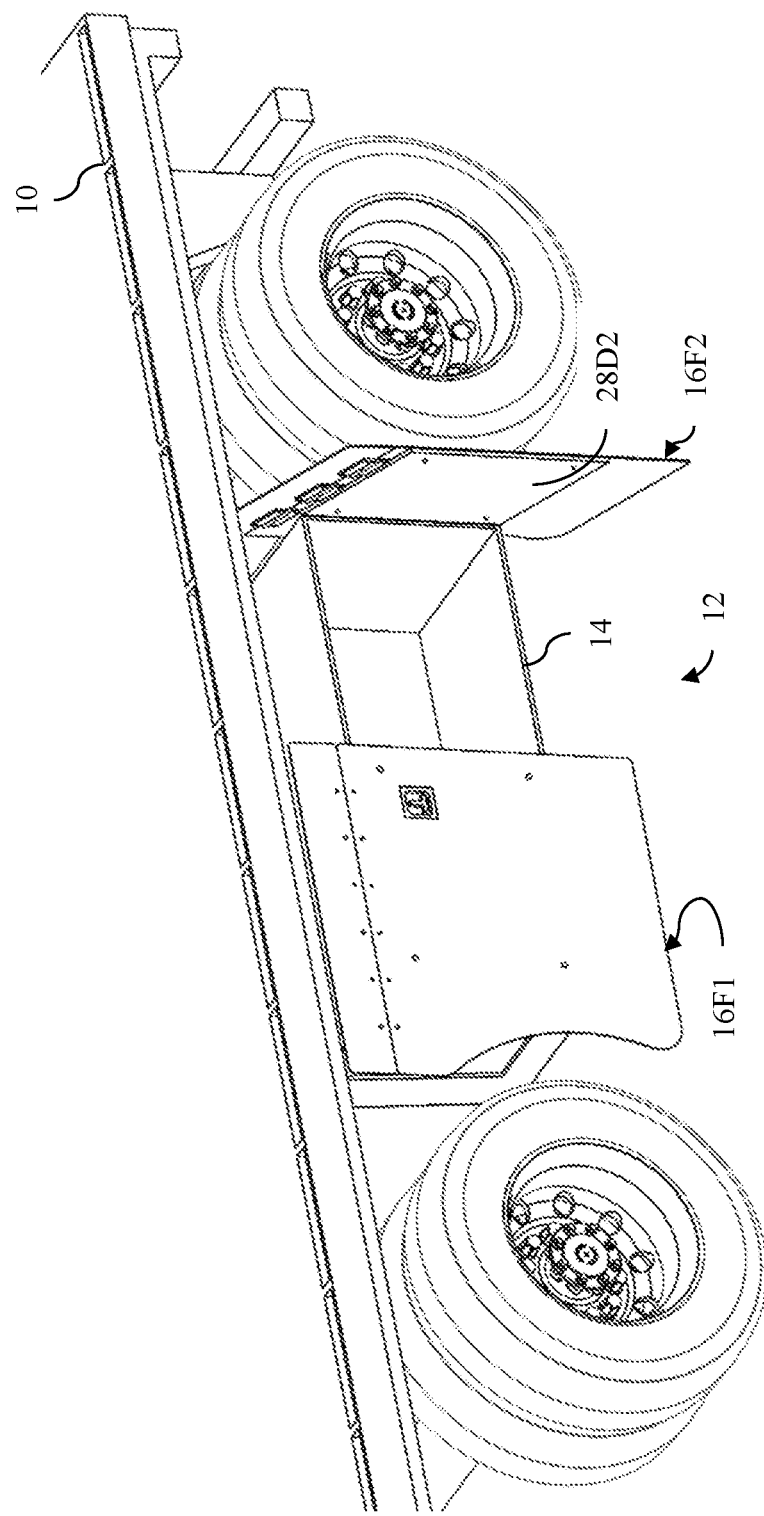
FIG. 2 depicts a perspective view of the embodiment of FIG. 1, illustrated with the second door thereof open.
Figure 3:
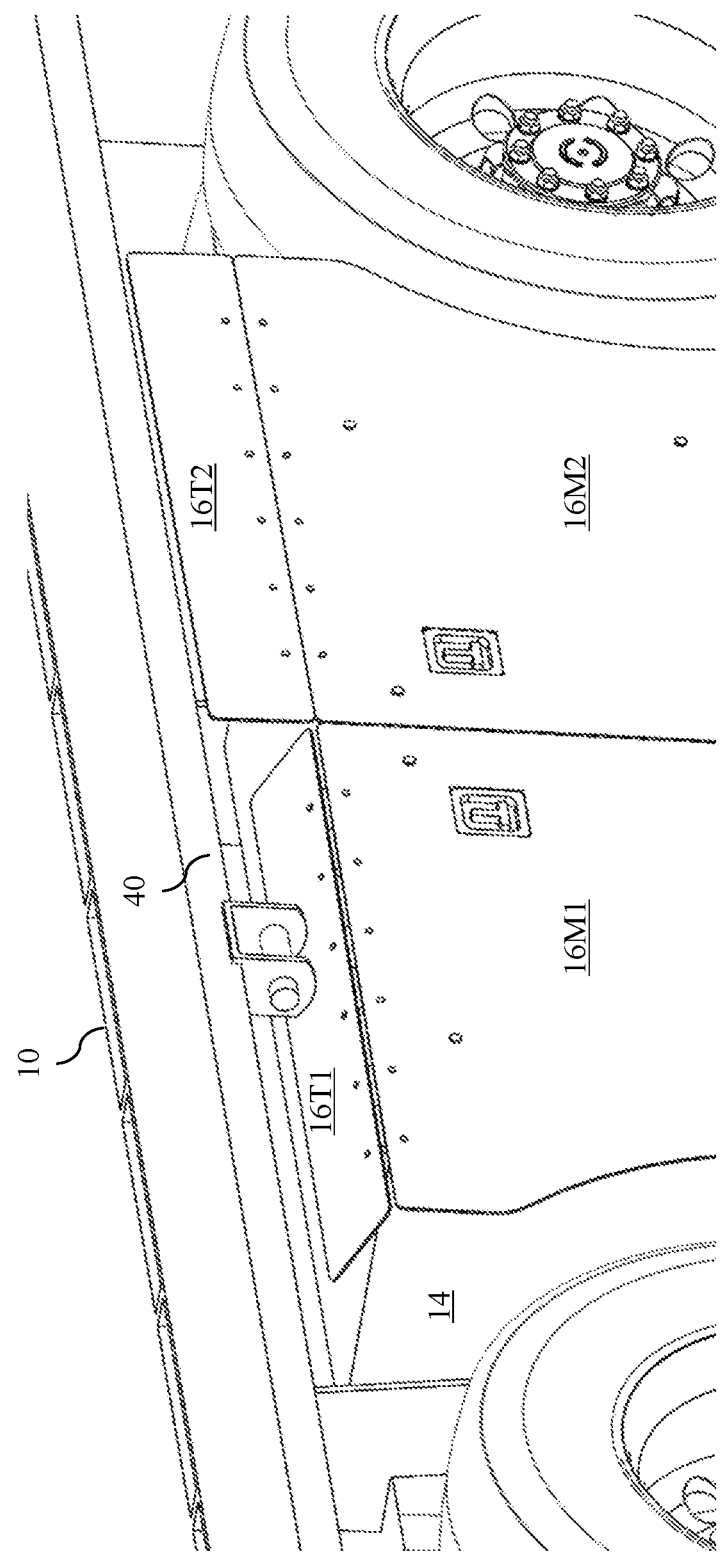
FIG. 3 depicts a partial perspective view of the embodiment of FIG. 1 illustrated with the first top fairing extension folded down.
Figure 4:
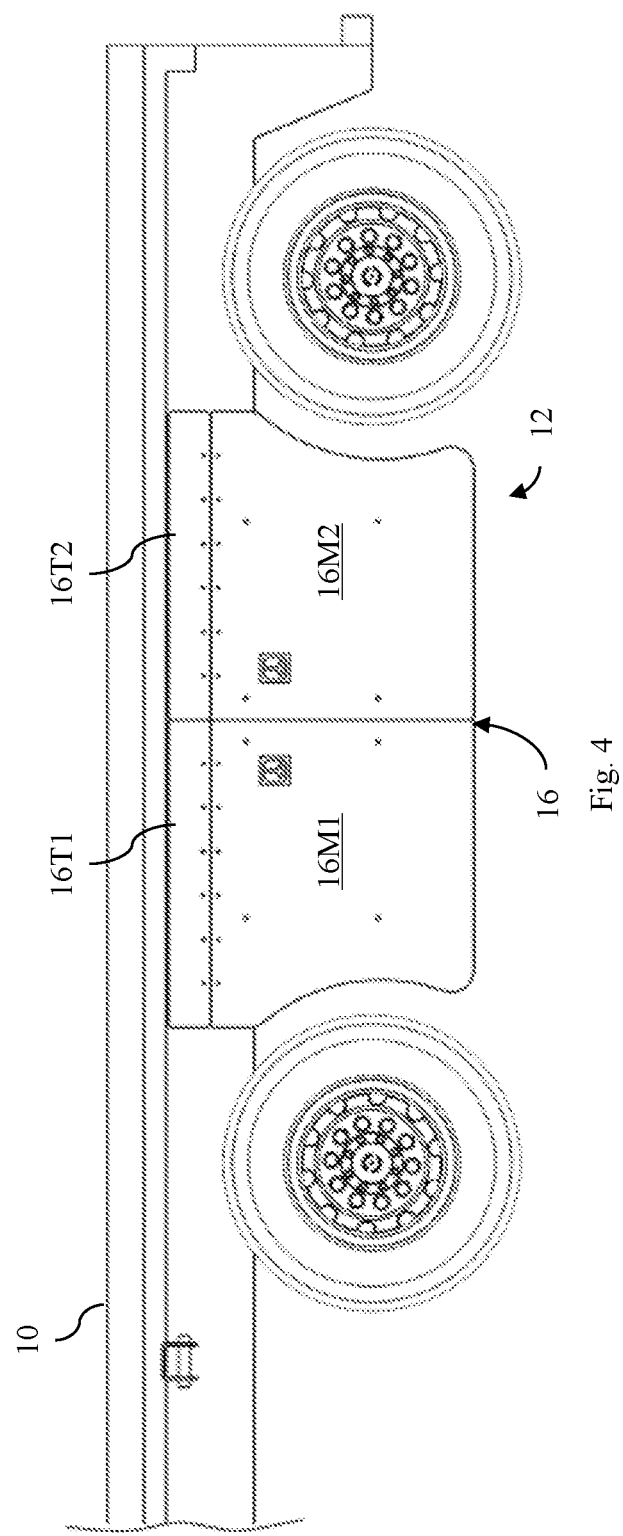
FIG. 4 depicts a side view of the embodiment of FIG. 1.

In the drawings, similar elements will be similarly numbered whenever possible. However, this practice is simply for convenience of reference and to avoid unnecessary proliferation of numbers, and is not intended to imply or suggest that our invention requires identity in either function or structure in the several embodiments.

DETAILED DESCRIPTION OF THE INVENTION

The disclosure and various features and advantageous details thereof are explained more fully with reference to the exemplary, and therefore non-limiting, embodiments illustrated in the accompanying drawings and detailed in the following description. Descriptions of known starting materials and processes may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises", "comprising", "includes", "including", "has", "having", or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example", "for instance", "e.g.", "in one embodiment", and the like. Furthermore, any dimensions, materials or other such characteristics are provided by way of example and not limitation.

Embodiments described herein provide systems and methods for improving the aerodynamics of toolboxes mounted on vehicles, and, in particular, tractor and trailer vehicles. Embodiments may be particularly suited for reducing aerodynamic drag, reducing or otherwise controlling the generation or distribution of spray/splash or improving the stability of large vehicles in an airstream.

Shown in FIG. 1 is a partial cutaway view of a tractor trailer 10 having mounted thereunder an aerodynamic toolbox assembly 12 constructed in accordance with the present invention. In general, the aerodynamic toolbox assembly 12 comprises a conventional toolbox 14 and an aerodynamic fairing facility 16. As can be seen best in FIG. 5 and FIG. 7, the toolbox 14 comprises: a top panel 18; a bottom panel 20; a rear panel 22; a first side panel 24; a second side panel 26; and a door panel 28 comprising a first door panel 28D1 and a second door panel 28D2. As shown by way of example in FIG. 7, the toolbox 14 may be suspended beneath the trailer 10 via a conventional mounting bracket 30.

Figure 5:
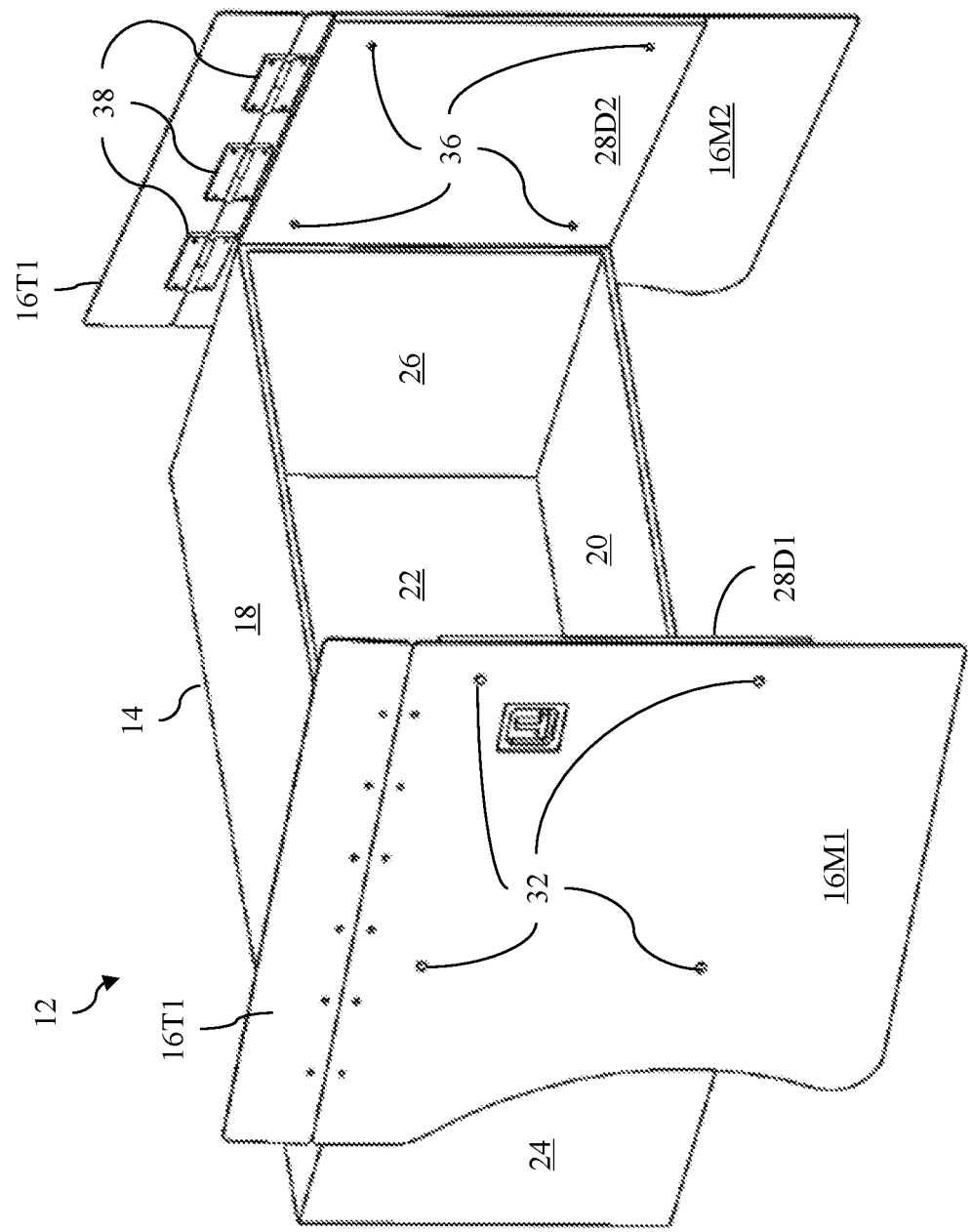
FIG. 5 depicts, in isolation, the embodiment of FIG. 1, illustrated with both doors open.
Figure 6:
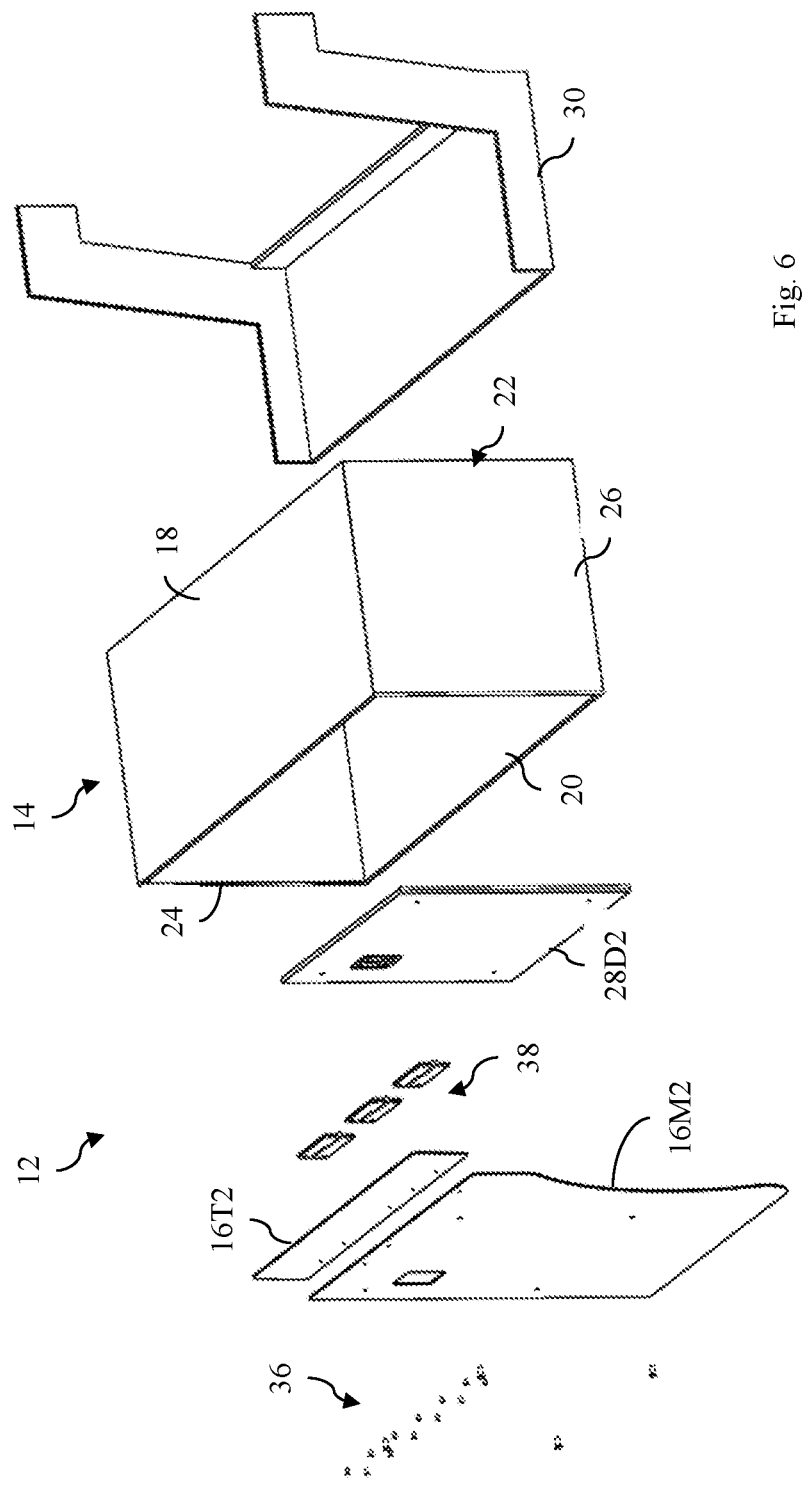
FIG. 6 depicts, in partial exploded form, the embodiment of FIG. 1.
Figure 7:
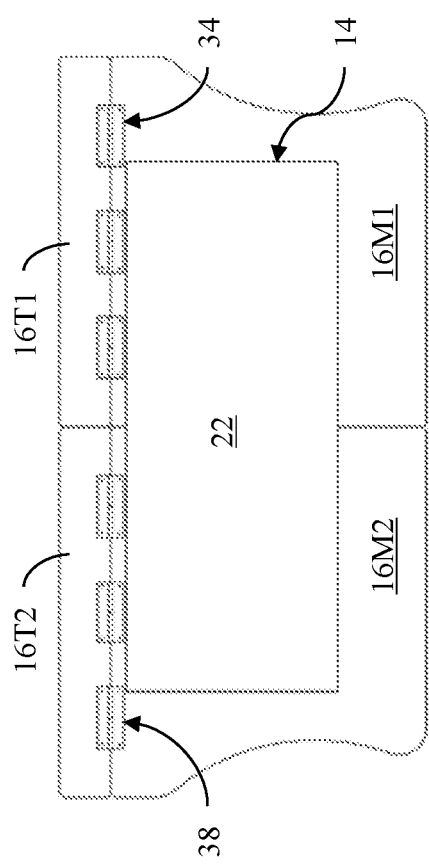
FIG. 7 depicts the rear view of the doors of the embodiment of FIG. 1.
Figure 8:
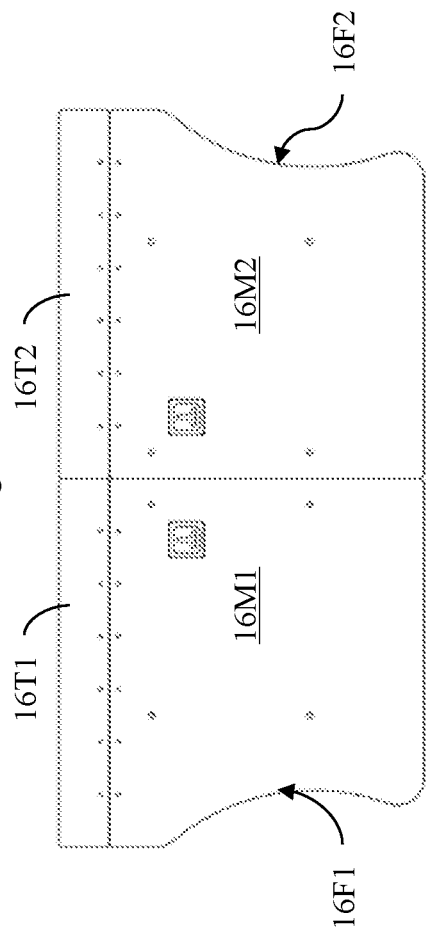
FIG. 8 depicts the front view of the doors of the embodiment of FIG. 1.
Figure 9:
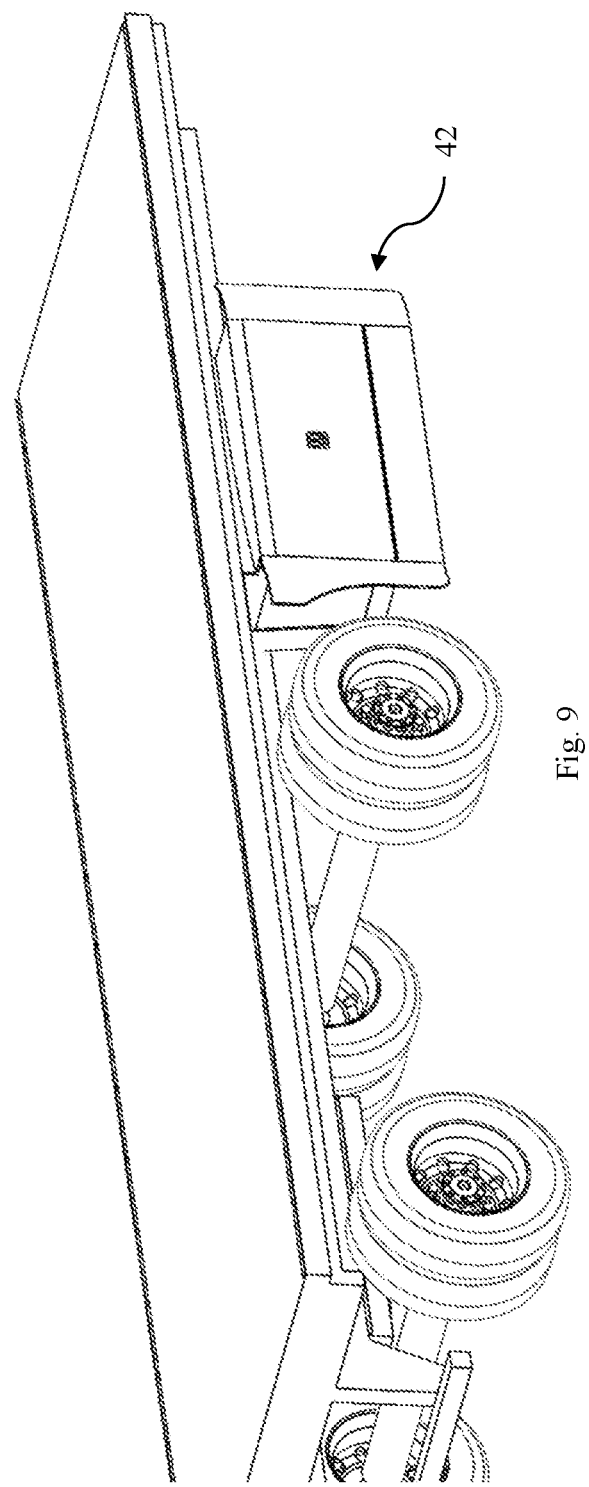
FIG. 9 depicts a perspective view of a second embodiment of an aerodynamic toolbox assembly mounted under a tractor trailer.
Figure 10:
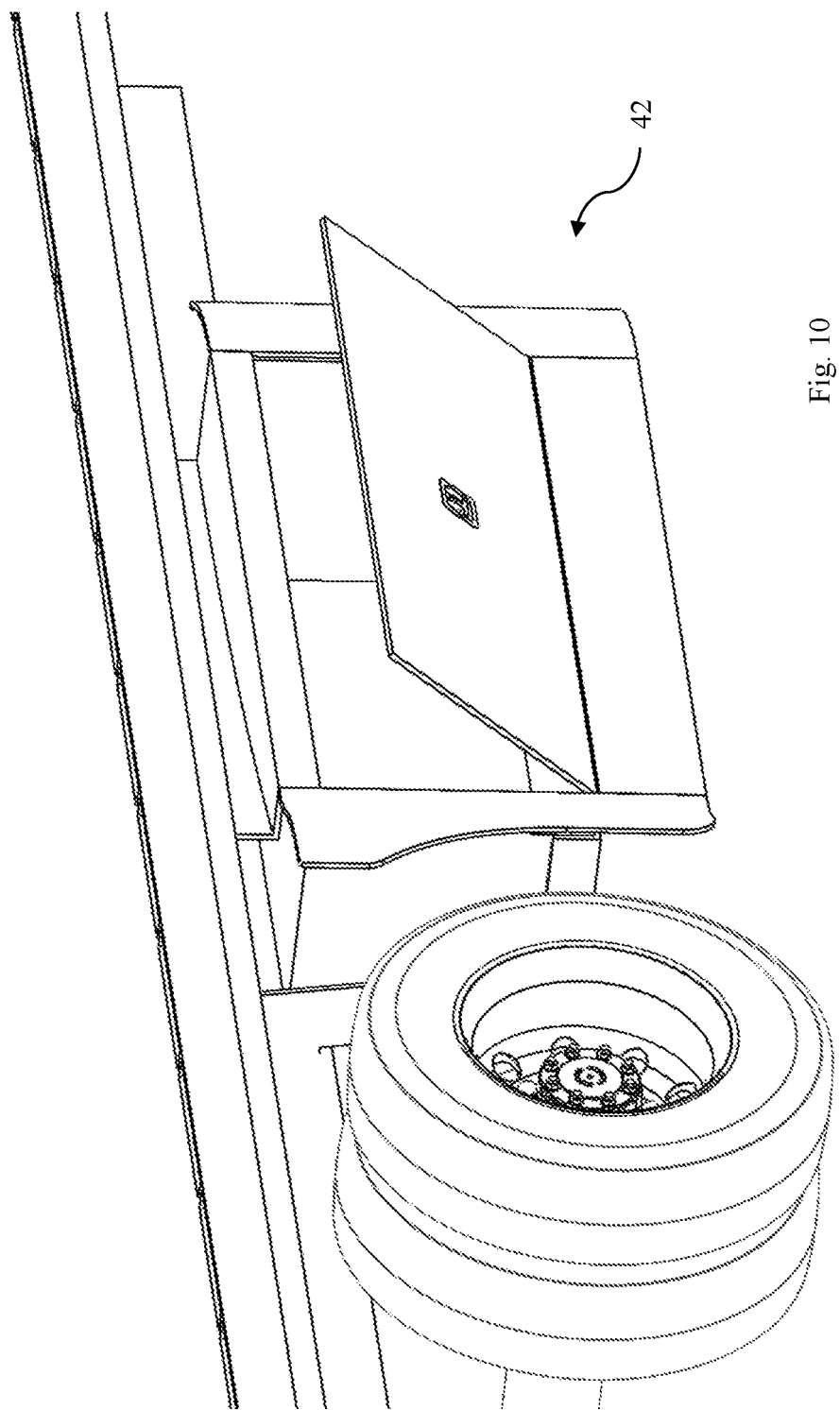
FIG. 10 depicts a perspective view of the embodiment of FIG. 9, illustrated with the door thereof open.
Figure 11:
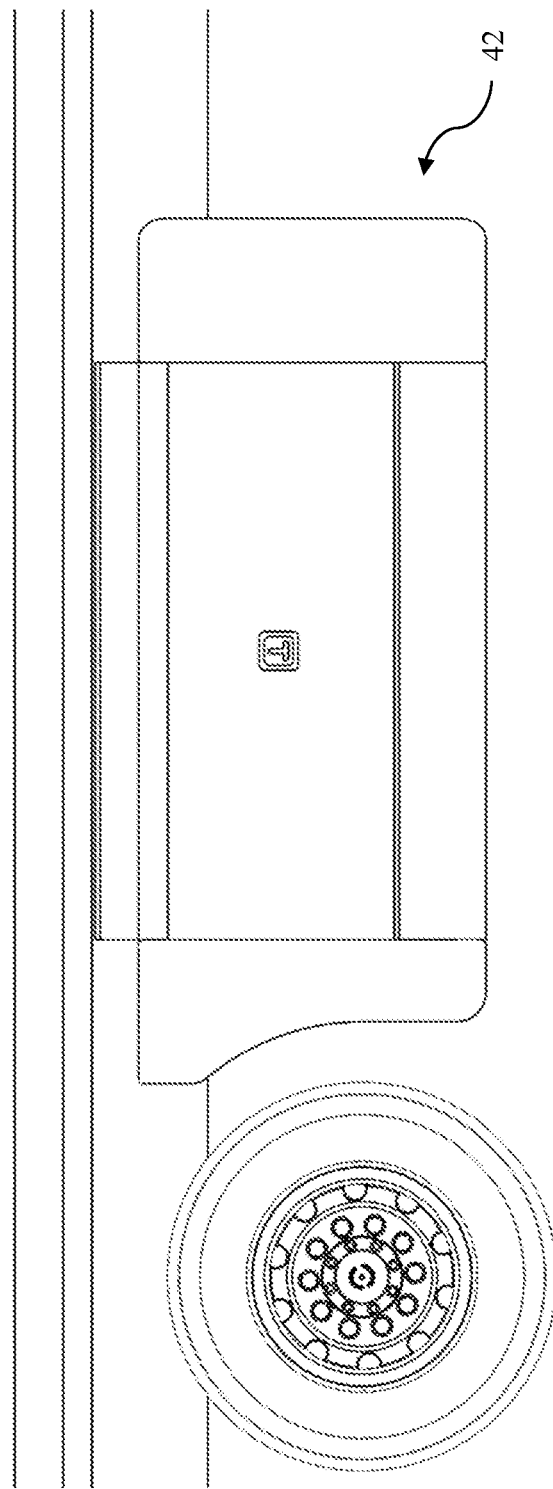
FIG. 11 depicts a side view of the embodiment of FIG. 10.
Figure 13:
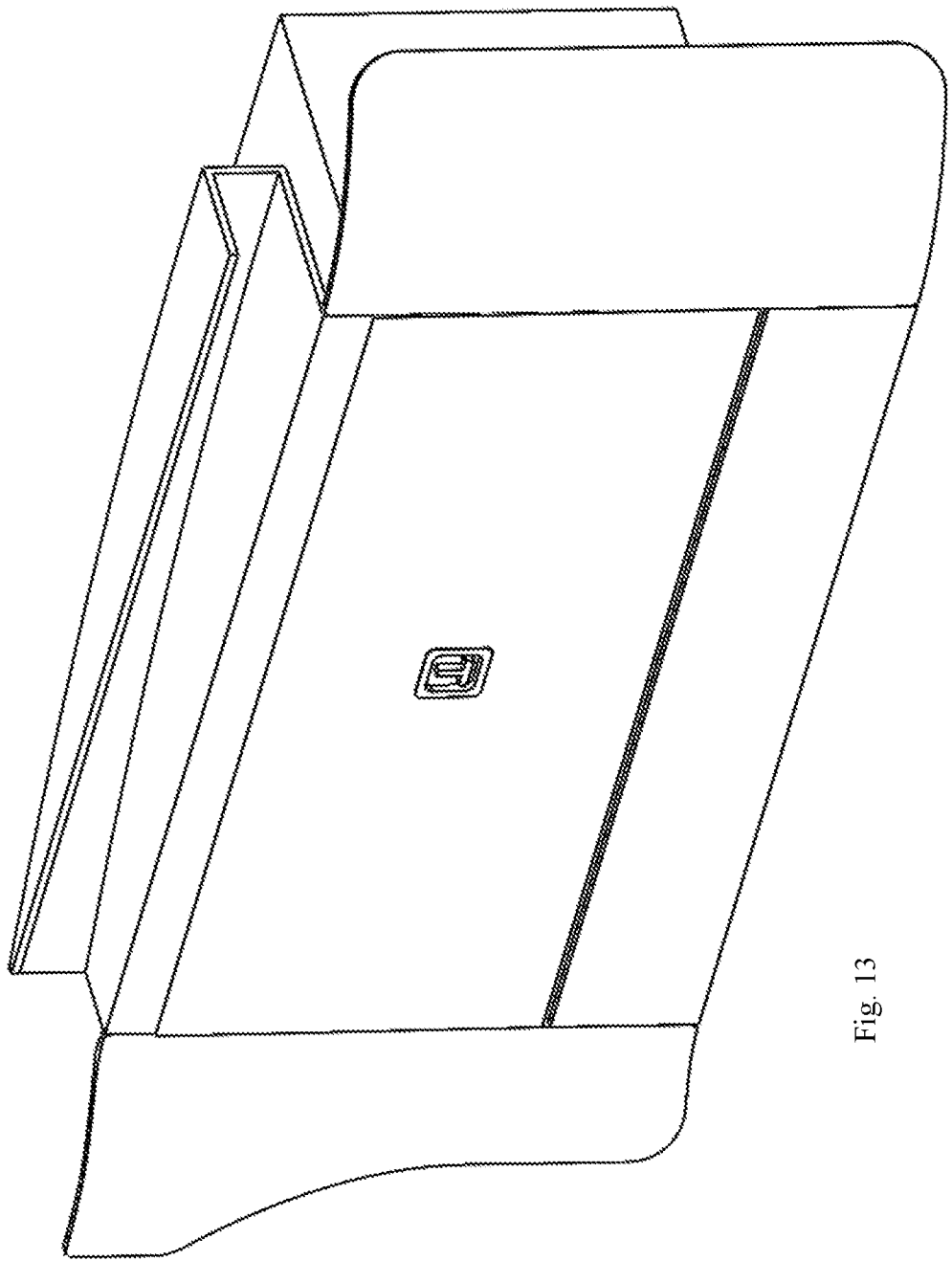
FIG. 13 depicts another perspective view of the embodiment of FIG. 10.
Figure 14:
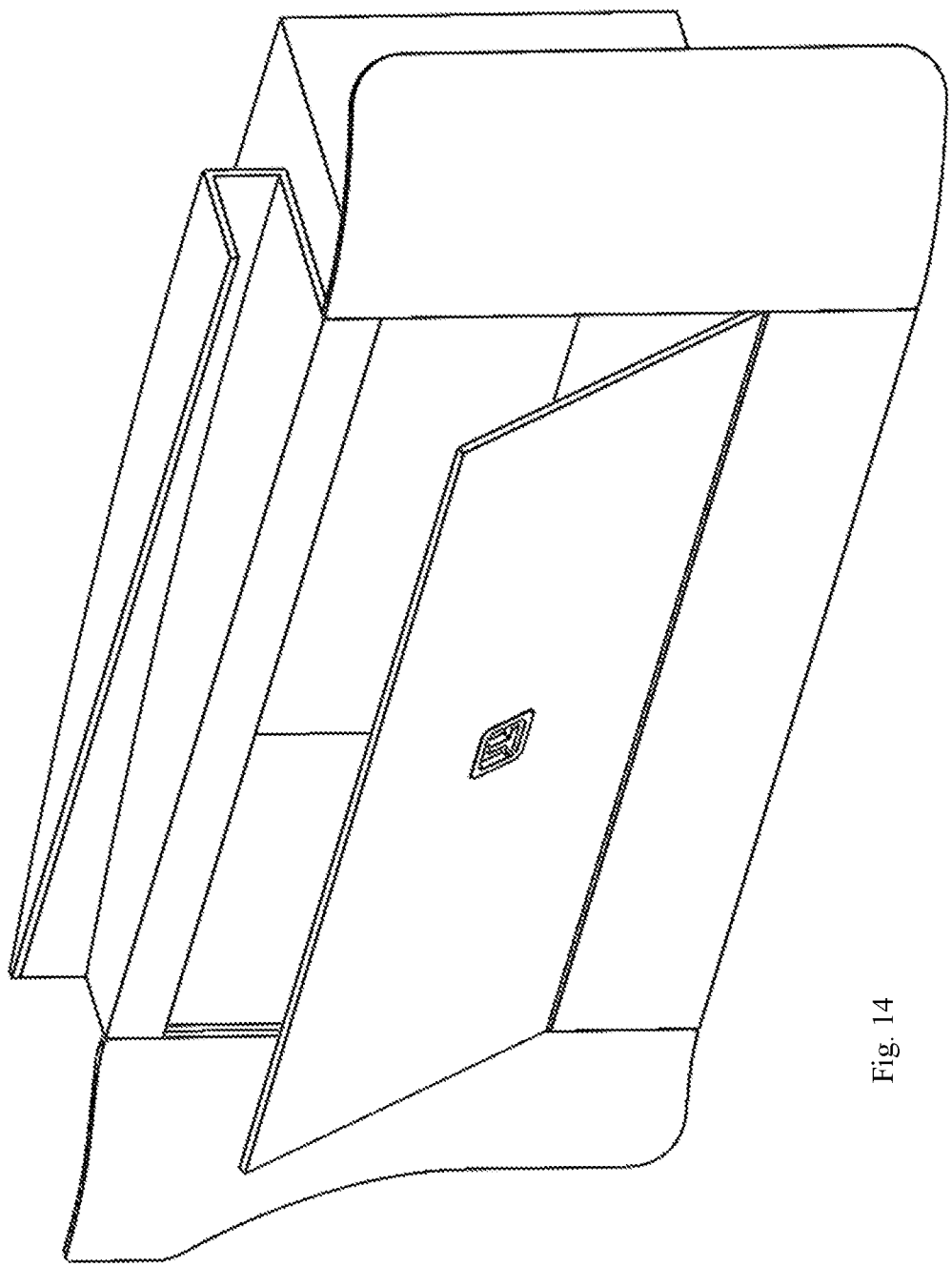
FIG. 14 depicts the embodiment of FIG. 13 with the door open.
Figure 15:
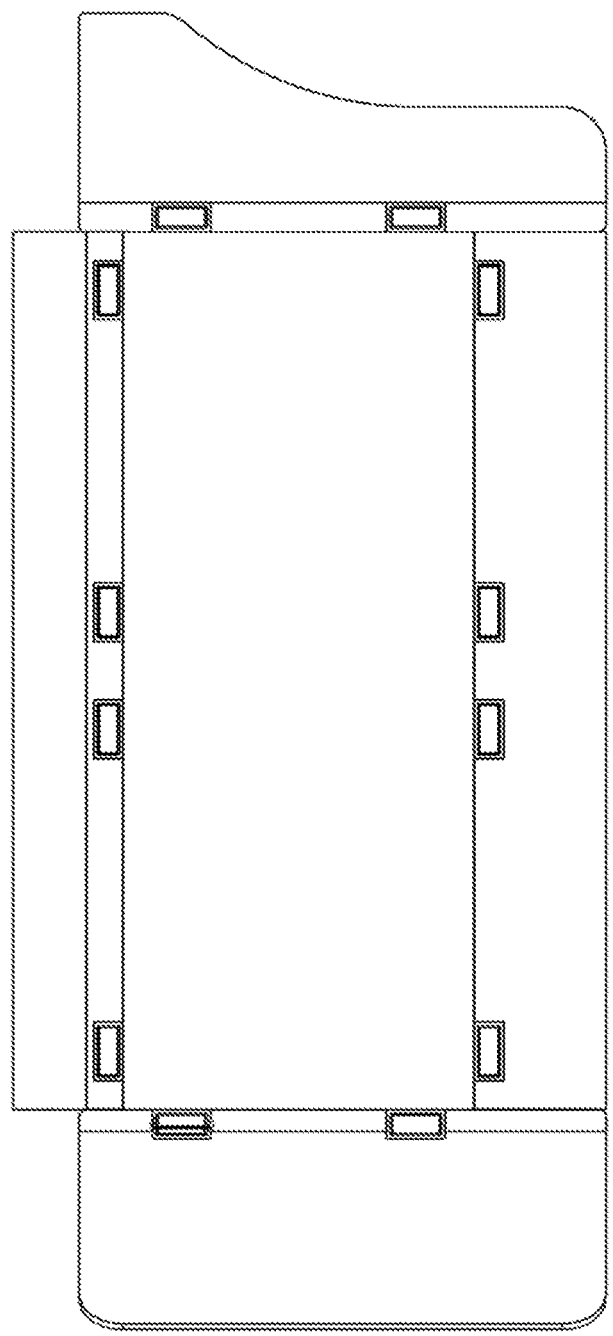
FIG. 15 depicts a rear view of the embodiment of FIG. 10.

In the embodiment illustrated in FIG. 1 through FIG. 8, the aerodynamic fairing facility 16 comprises: a first fairing assembly 16F1 comprising a first main fairing 16M1 coupled via bolts 32 to the first door 28D1 of the toolbox 14 (see, e.g., FIG. 5) and a first top fairing 16T1 coupled via one or more spring hinges 34 to the top edge of the first main fairing 16M1 (see, e.g., FIG. 7); and a second fairing assembly 16F2 comprising a second main fairing 16M2 coupled via bolts 36 to the second door 28D2 of the toolbox 14 (see, e.g., FIG. 5) and a second top fairing 16T2 coupled via one or more spring hinges 38 to the top edge of the second main fairing 16M2 (see, e.g., FIG. 7). In this embodiment, at least one of the fairing assemblies 16F1 and 16F2 is configured to extend beyond one of the edges of the front panels 28D1 and 28D2, respectively, of the toolbox 14, thereby to improve the aerodynamic flow of air past the toolbox 14 during normal operation of the trailer 10. For example, as shown in FIG. 5, the second main fairing 16M2 of the second fairing assembly 16F2 is configured to extend vertically downwardly below the bottom edge of the second front door panel 28D2 of the toolbox 14; further, the second main fairing 16M2 of the second fairing assembly 16F2 is also configured to extend horizontally rearwardly (i.e., with respect to the normal direction of travel of the trailer 10) beyond the second edge of the second front door panel 28D2 of the toolbox 14. In addition, the second top fairing 16T2 of the second fairing assembly 16F2 is spring biased so as generally to extend vertically upwardly above the top edge of the second front door panel 28D2 of the toolbox 14. The first fairing assembly 16F1 is similarly configured. In this embodiment, either the first top fairing 16T1 or the second top fairing 16T2 may easily be rotated backwardly about the horizontal rotational axes of hinges 36 or 38, respectively, i.e., toward the top panel 18 of the toolbox 14, so as to accommodate, inter alia, a conventional sliding ratchet wrench 40 (see, e.g., FIG. 3).

Although, in the embodiment illustrated in FIG. 1 through FIG. 8, we have shown the fairing assemblies 16 as being removably coupled to respective door panels 28 of the toolbox 14, the fairing assemblies 16 and the door panels 28 can easily be combined so as to form integral aerodynamic fairing door panels (see, e.g., FIG. 25), each pivotally connected to a selected one of the top panel 18, the bottom panel 20, the first panel 24 or the second panel 26.

Figure 16:
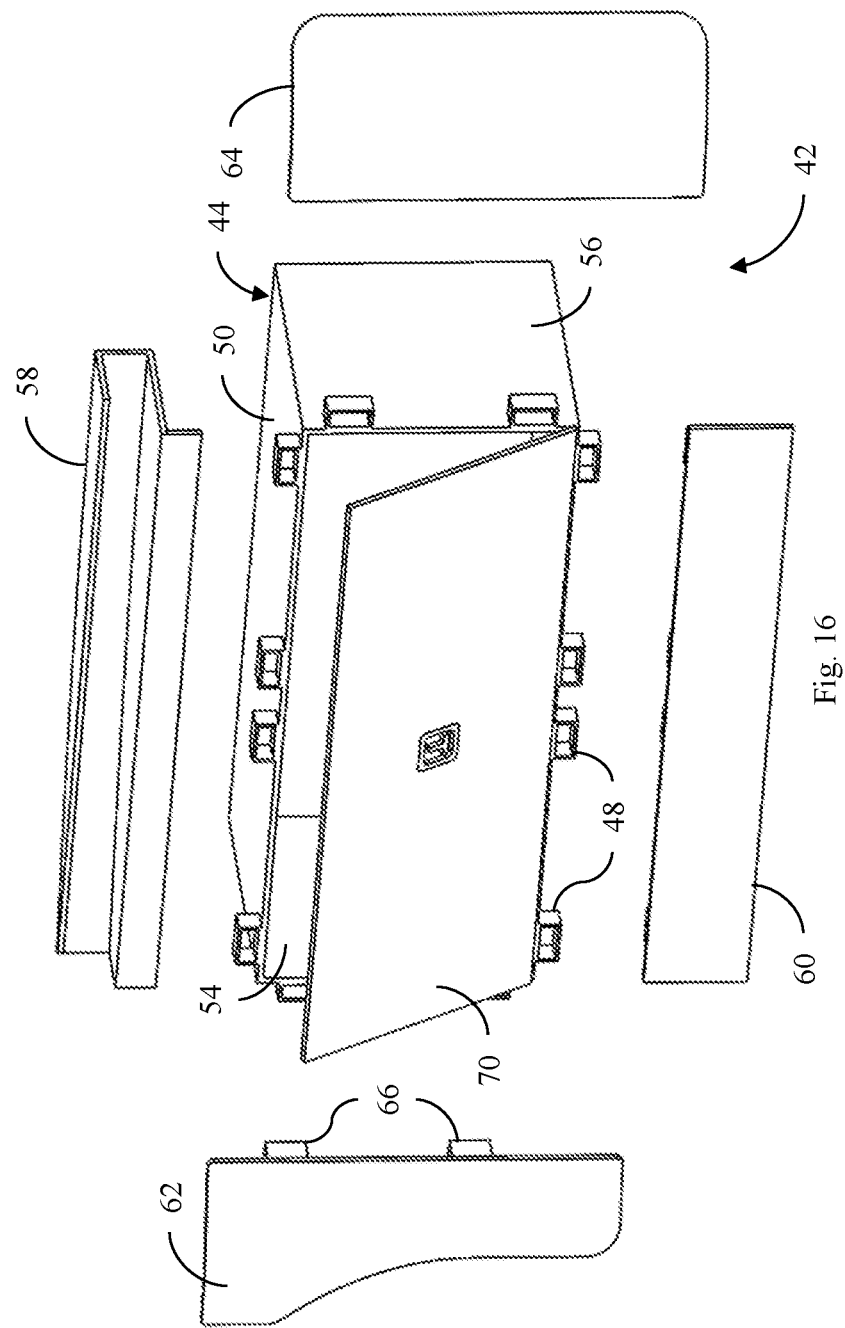
FIG. 16 depicts, in front perspective exploded form, the embodiment of FIG. 10.
Figure 17:
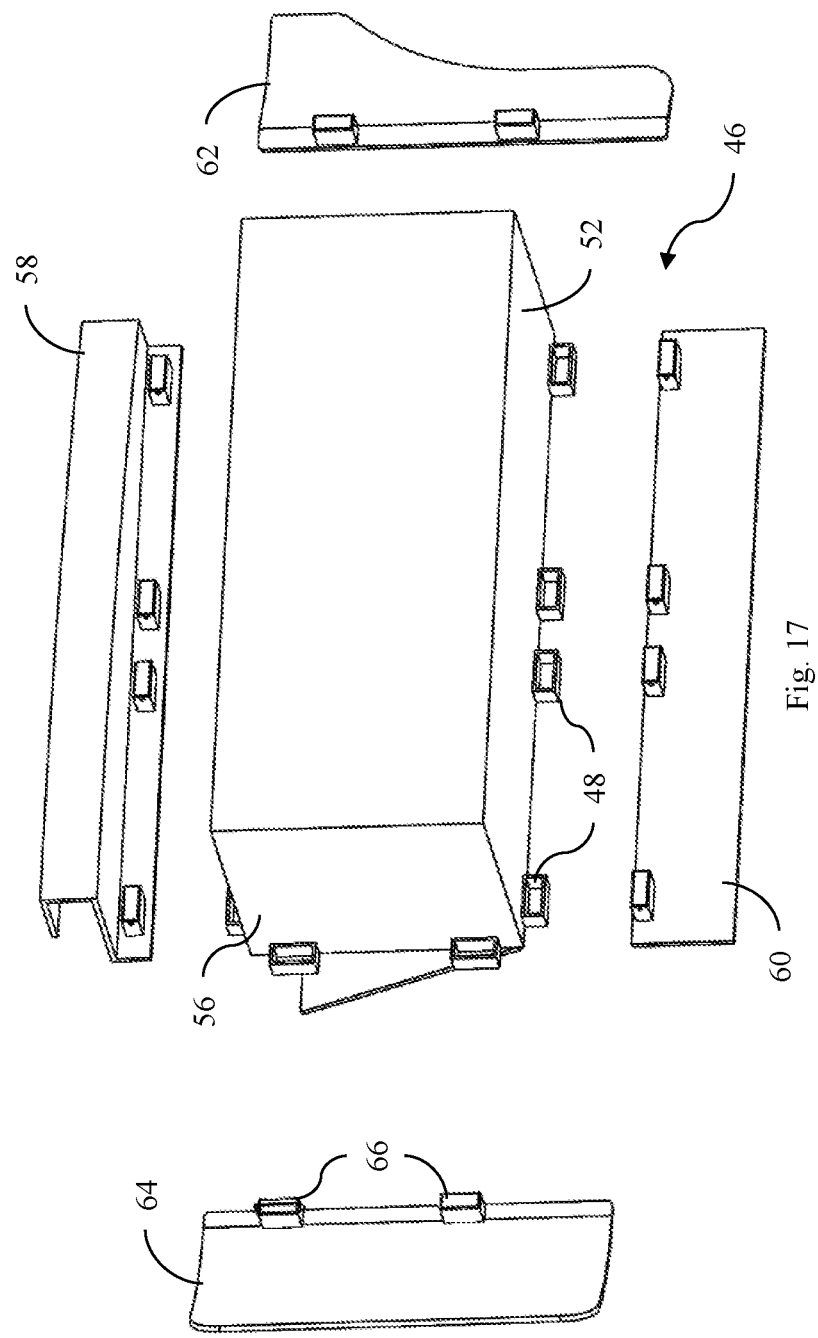
FIG. 17 depicts, in rear perspective exploded form, the embodiment of FIG. 10.
Figure 18:
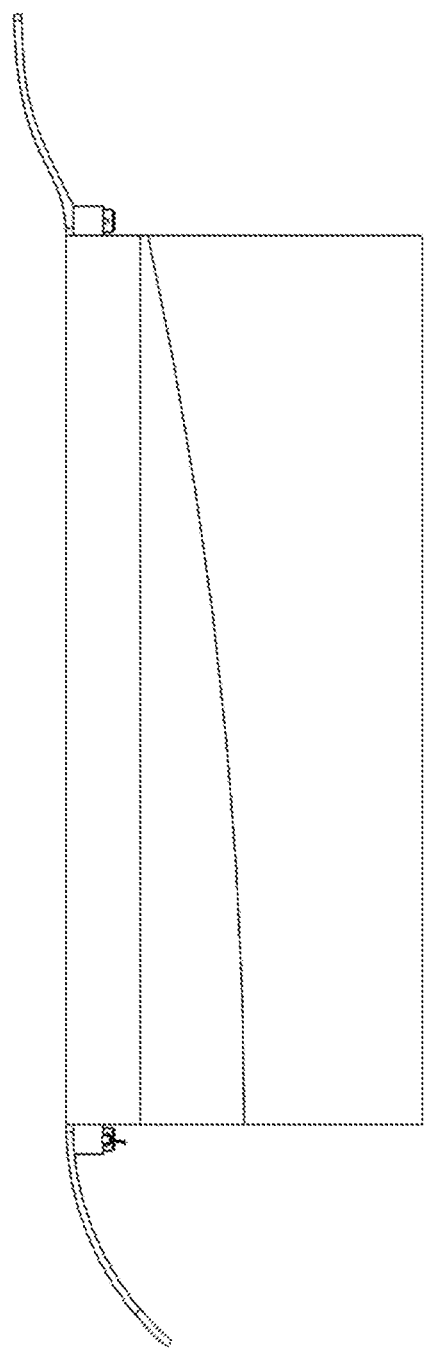
FIG. 18 depicts a top plan view of the embodiment of FIG. 10.
Figure 19:
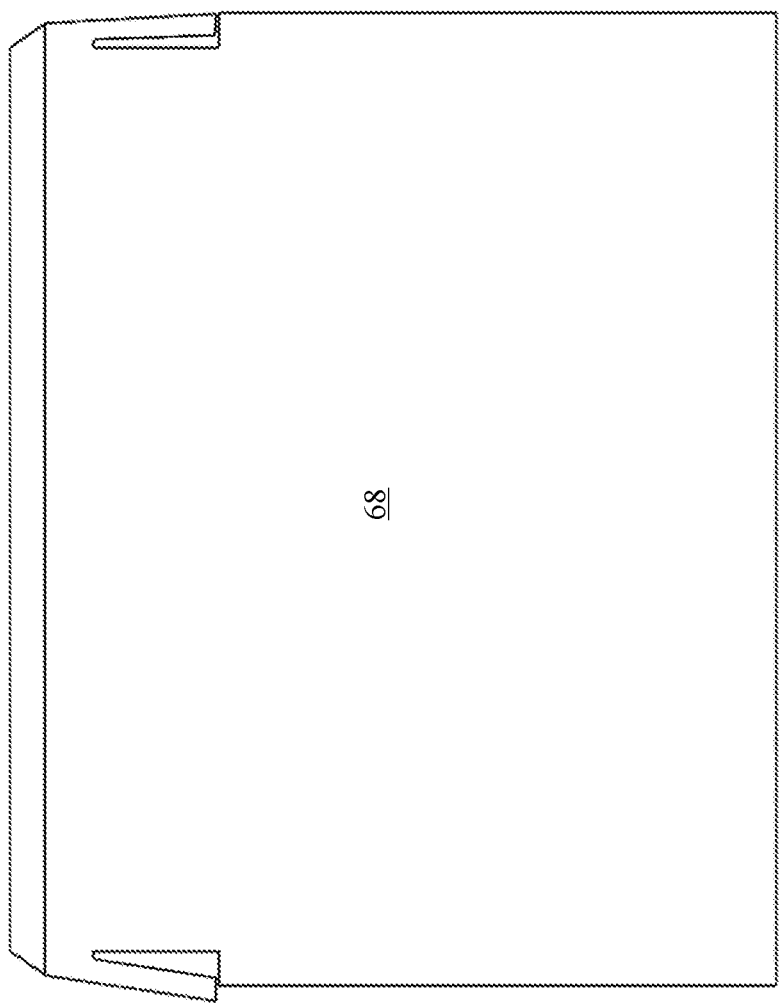
FIG. 19 depicts a side perspective of a self-latching plug configured to couple to a socket of the embodiment of FIG. 12.
Figure 20:
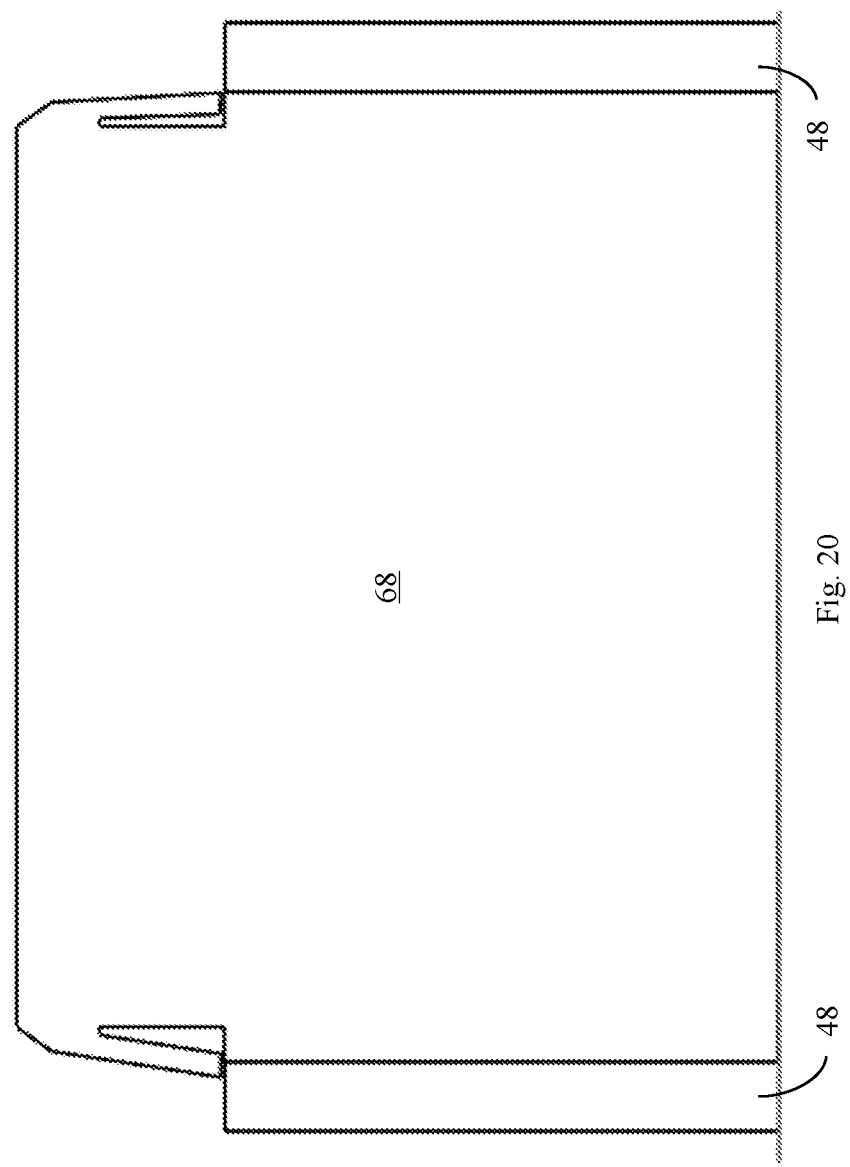
FIG. 20 depicts a cross-sectional view of the self-latching plug of FIG. 19 coupled to a socket of the embodiment of FIG. 12.
Figure 21:
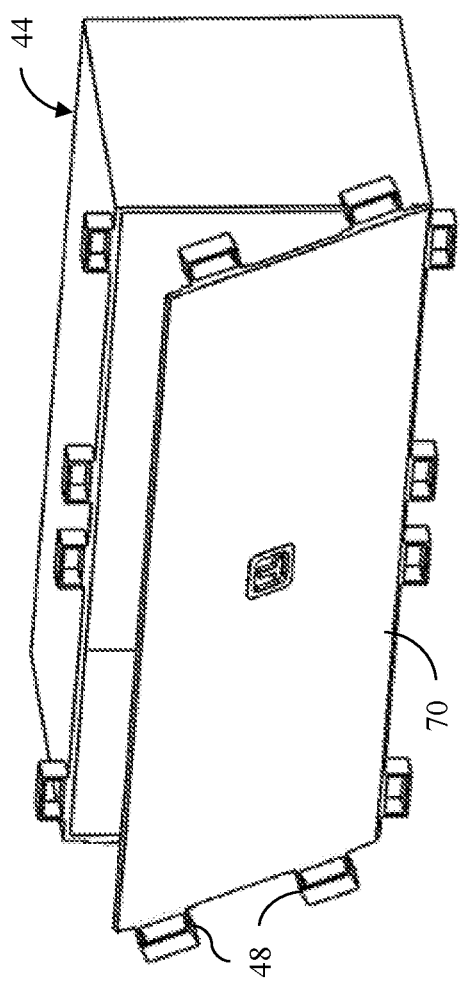
FIG. 21 depicts a perspective view of an alternate embodiment of the toolbox of FIG. 10.
Figure 22H:
Figure 22G:
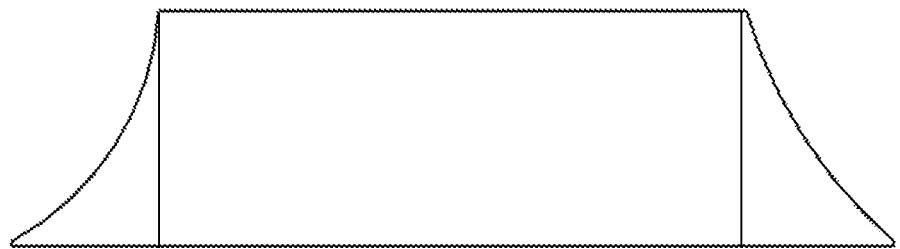
Figure 22F:
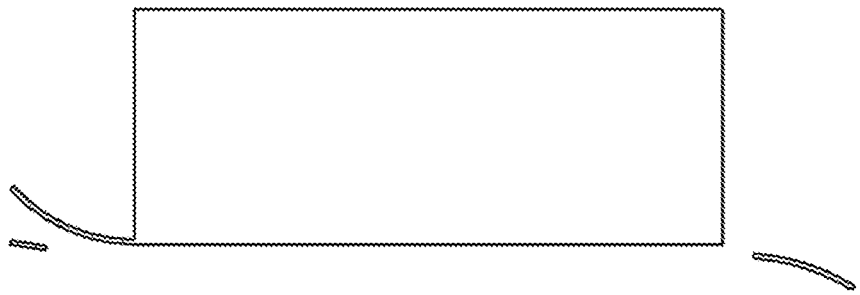
Figure 22E:
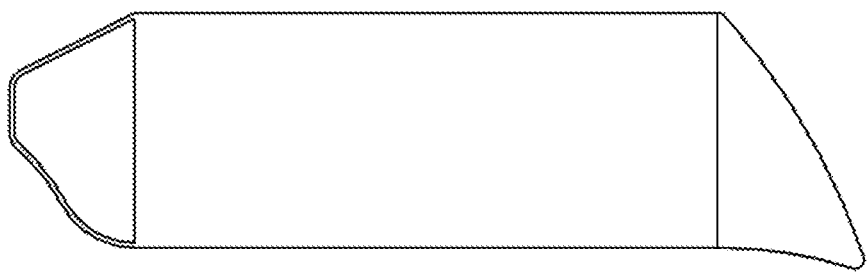
Figure 22L:
Figure 22K:
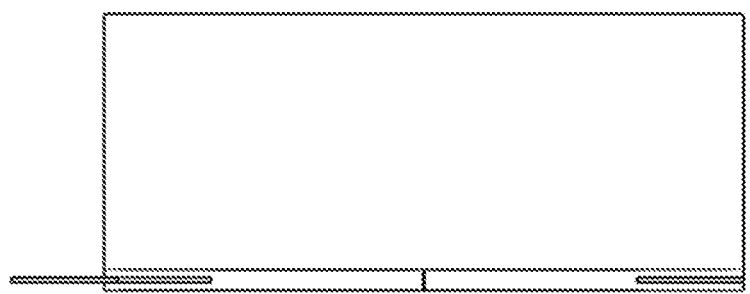
Figure 22J:
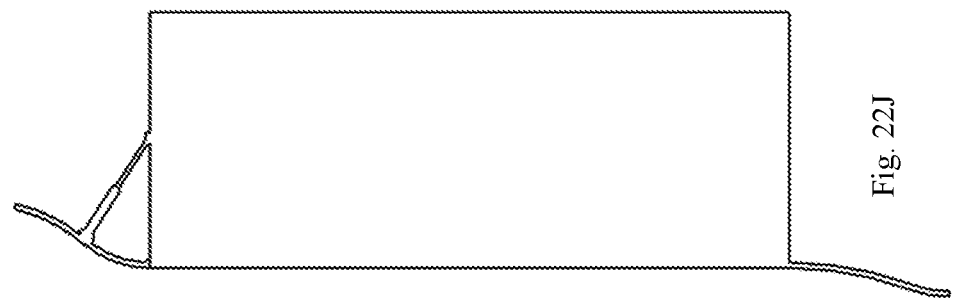
Figure 22I:
Figure 23B:
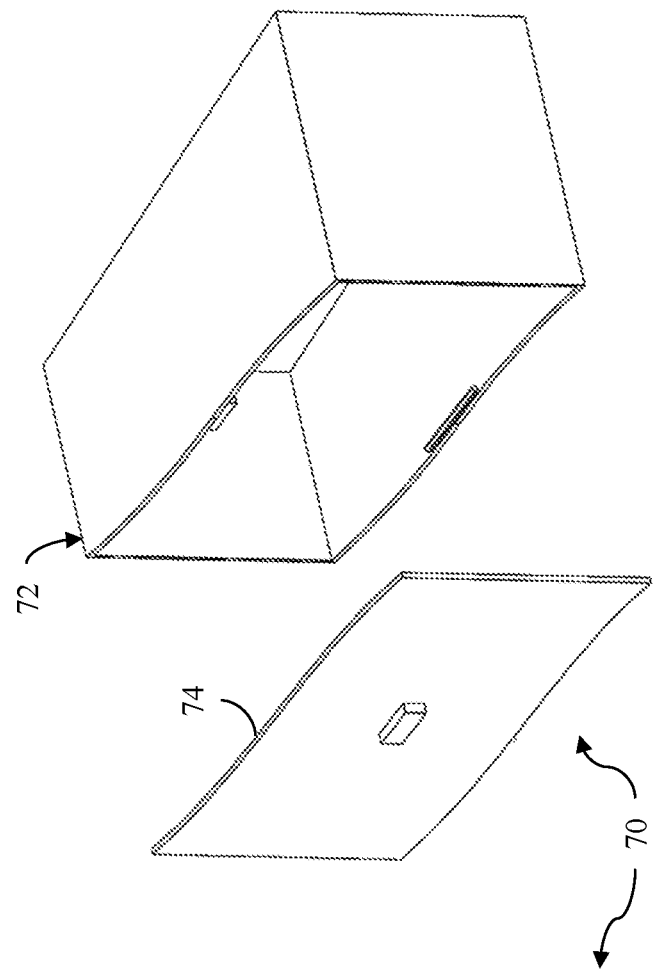
Figure 23A:
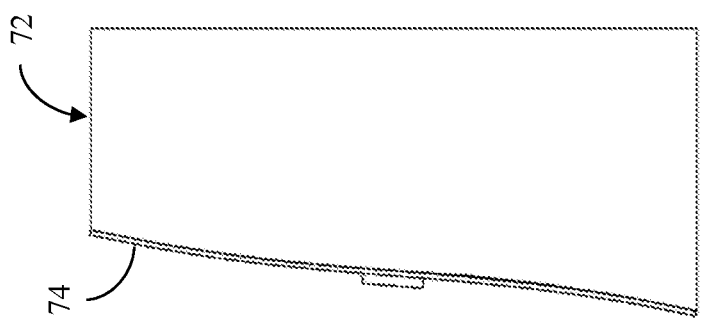
Figure 23C:
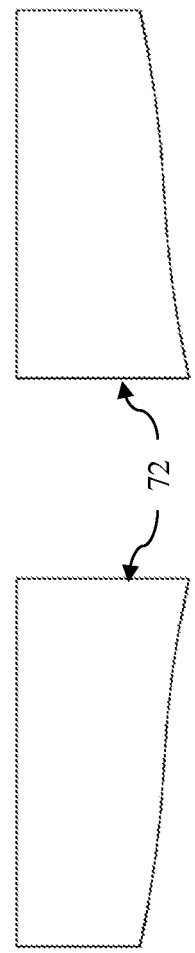
Figure 23D:
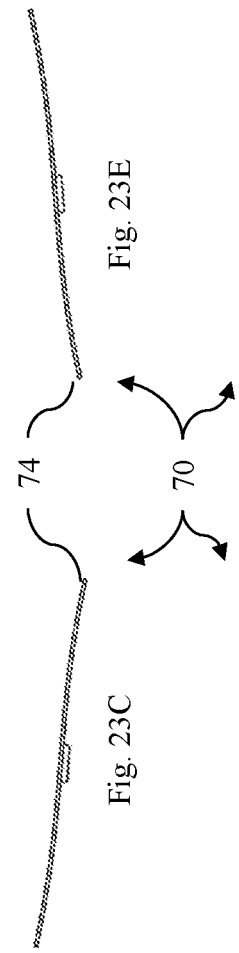
Figure 23E:
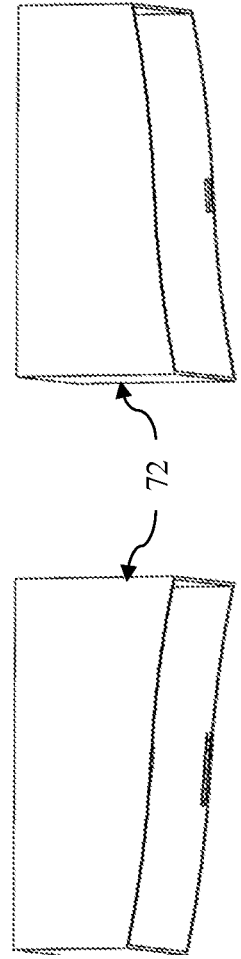
Figure 23F:
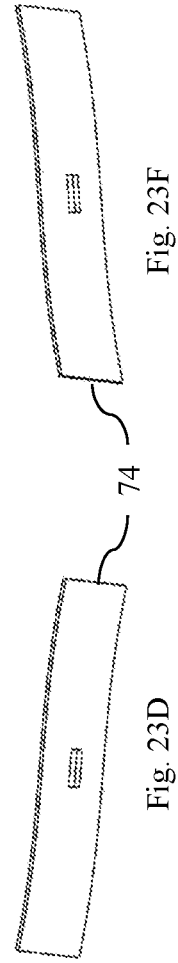
Figure 23H:
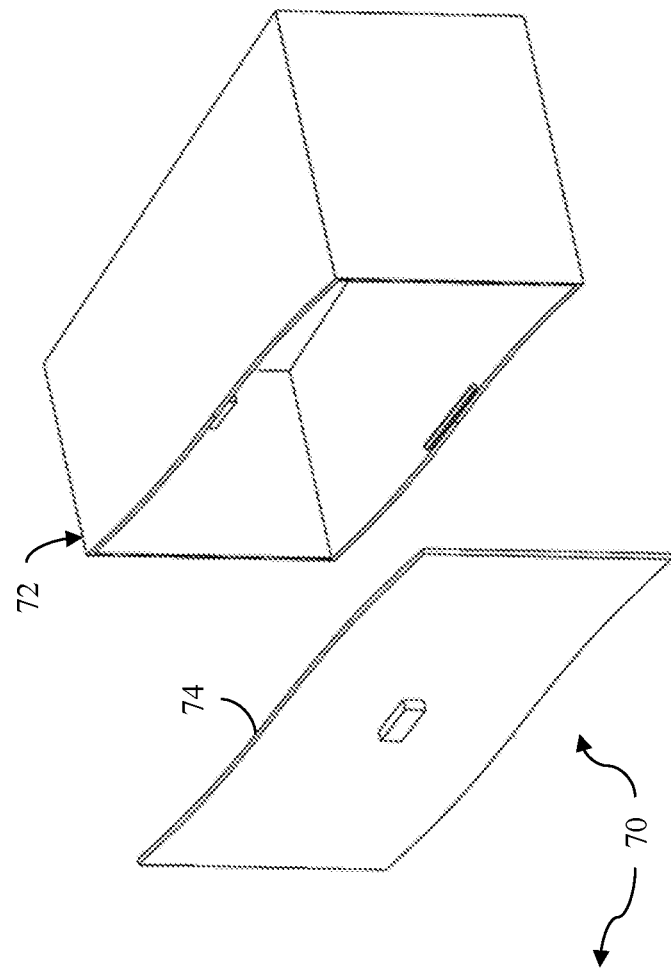
Figure 23G:
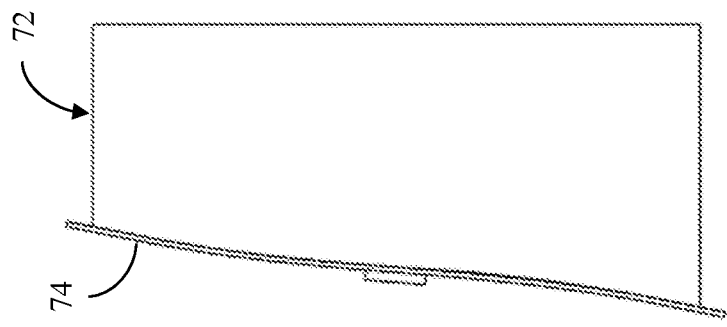

In the embodiment illustrated in FIG. 9 through FIG. 18, the aerodynamic toolbox assembly 42 comprises a toolbox 44 and an aerodynamic fairing facility 46. As can be seen in FIG. 16, the toolbox 44 is configured with a plurality of receiver sockets 48 coupled to the front edges of each of the top panel 50, bottom panel 52, the first panel 54 and the second panel 56. As can be seen in FIG. 17, the aerodynamic fairing facility 46 comprises a top fairing panel 58, bottom fairing panel 60, a first side fairing panel 62 and a second side fairing panel 64, each configured with a plurality of plugs 66 adapted to couple with respective sockets 48 on the toolbox 44. In one embodiment, shown in FIG. 12, each plug 66 can be removably coupled to a respective socket 48 via a captive pin 68 or the like. In one other embodiment, shown in FIG. 19 and FIG. 20, one or more of the plugs 66 can be configured to be self-latching. In yet another embodiment, the receiver sockets 48 for at least some of the fairing panels, e.g., the side fairing panels 62-64, are coupled to the edges of door panel 70 of the toolbox 44 as shown in FIG. 21.

Shown in FIG. 22 are several alternative cross-sectional configurations of the leading (depicted at the top of the respective figures) and trailing (depicted at the bottom of the respective figures) side fairing panels 62-64. As shown in FIG. 22A through FIG. 22D, the aerodynamic panels at the leading edge and at the trailing edge may be straight, angled, S-curved, rounded with a radius, or of a varying number of shapes that may be preferable for aerodynamics. FIG. 22E, FIG. 22G and FIG. 22H show how the shape of the front and rear of the toolbox may provide an outward-facing fairing surface as well as an inward-facing fairing surface. These embodiments also demonstrate how the structure of the toolbox can be modified whereby the fairings can increase the rigidity and/or the storage space of the toolbox. FIG. 22F illustrates how the fairings may provide venting or ducts in order to control airflow in a preferable method. FIG. 22I illustrates how the leading/trailing fairings may have supports that mount to the front and rear panels of the toolbox and extend inward by a portion of the depth of the toolbox. FIG. 22J shows a leading fairing configured to be supported by a suitable mechanism such as a hinging mechanism, a spring mechanism, a shock-absorbing mechanism, or otherwise. FIG. 22K and FIG. 22L show how the aerodynamic panels may be telescopic and thus can be stowed inside the doors of the toolbox or adjacent to the doors of the toolbox, respectively.

In the embodiment shown in FIG. 23, the aerodynamic toolbox assembly 70 comprises a shaped toolbox 72 configured such that the shaped door panel 74 provides an aerodynamic surface that has a leading edge further inboard than the trailing edge. While the use of a toolbox having a fixed shape may not be preferable due to the requirement for a different toolbox for mounting on the left side or right side of the vehicle, this embodiment shows how toolbox 70 can be configured with a reversible door panel and a relocatable door hinge that can allow the same toolbox assembly to be used on both sides of the vehicle. Also in this embodiment, it can be seen that the dimensions of the first and second side panels may be selected so as to improve the aerodynamic characteristics of the shaped toolbox 72.

In the embodiment shown in FIG. 24, the toolbox 44 of, e.g., FIG. 16 is configured to support a mud flap 76 coupled to a flange 78 coupled to, and extending below, the lower edge of the trailing side panel of toolbox 44. In some applications, it may be desirable for other accessories, such as tire chain hangers, to mount to the toolbox in a similar manner.

Figure 25A:
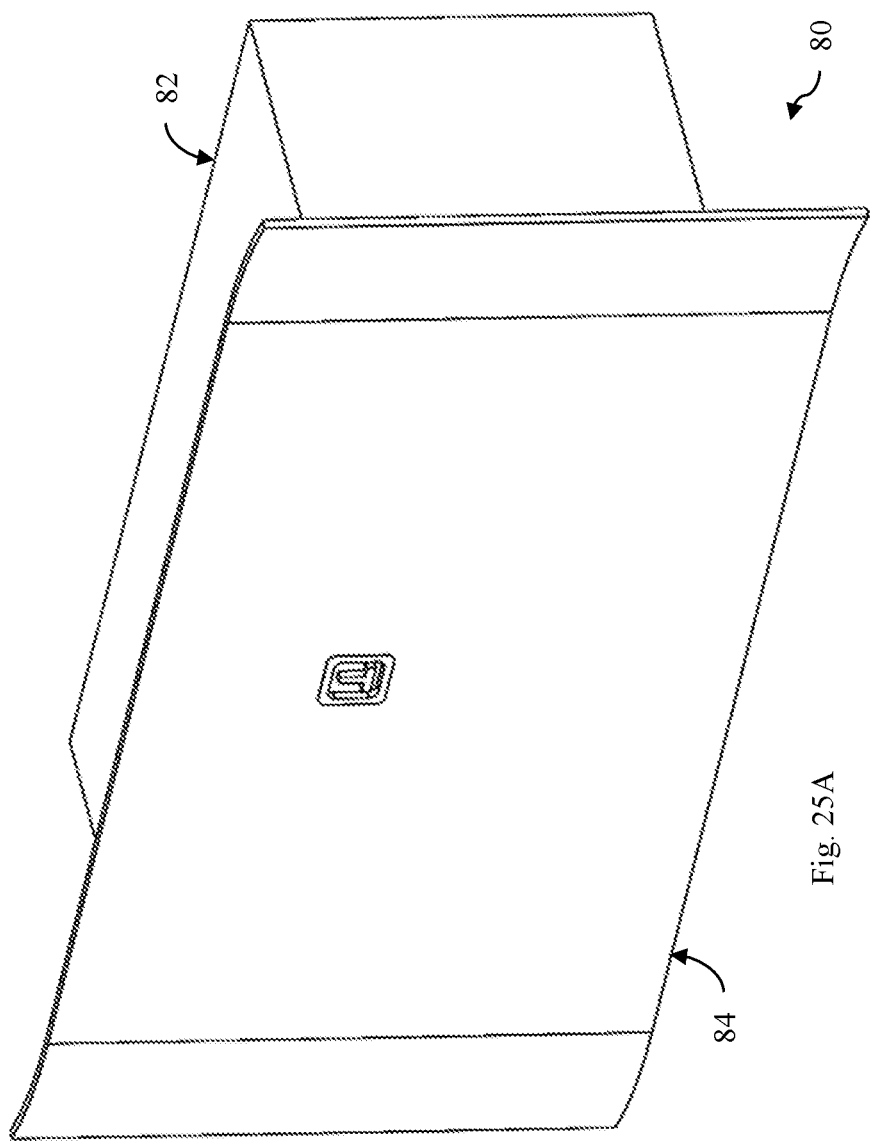
Figure 25C:
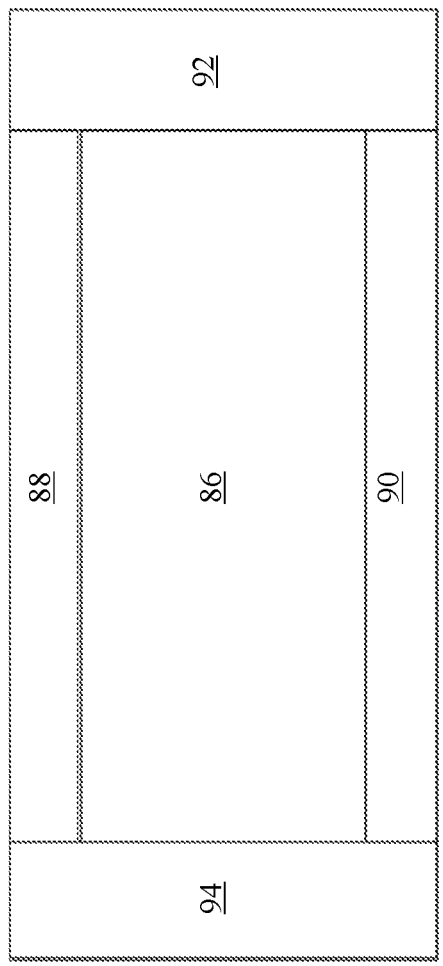
Figure 25D:
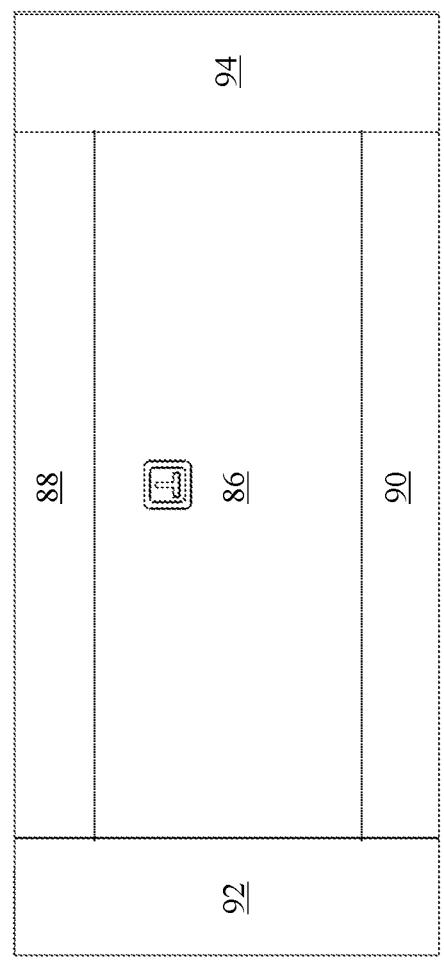
Figure 26A:
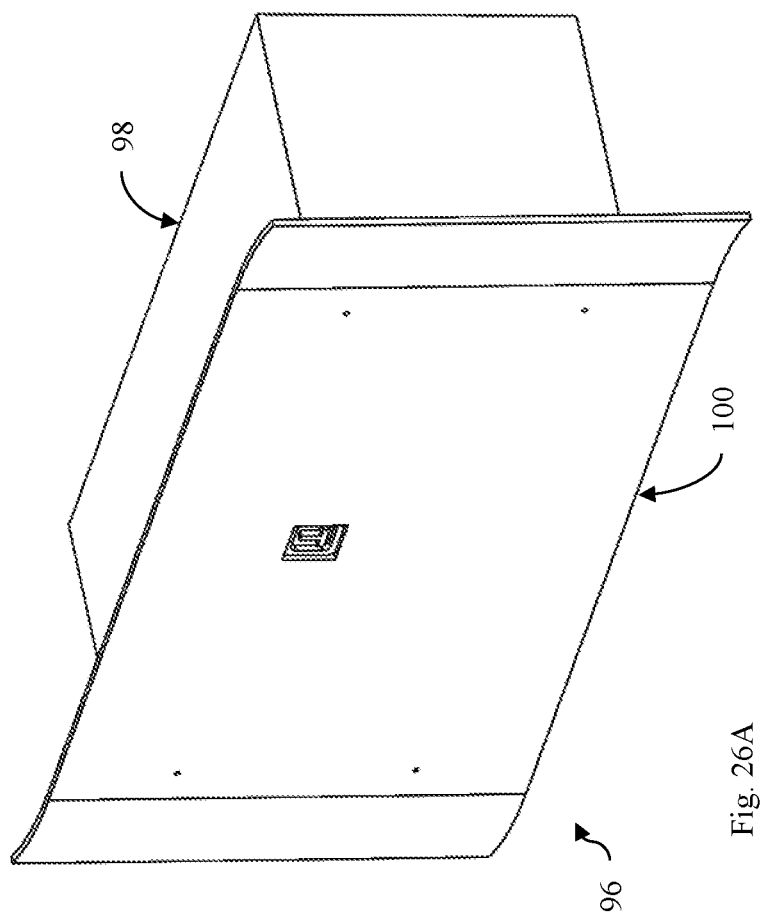
FIG. 26A, FIG. 26B, FIG. 26C and FIG. 26D, depicts a sixth embodiment of an aerodynamic toolbox.
Figure 26B:
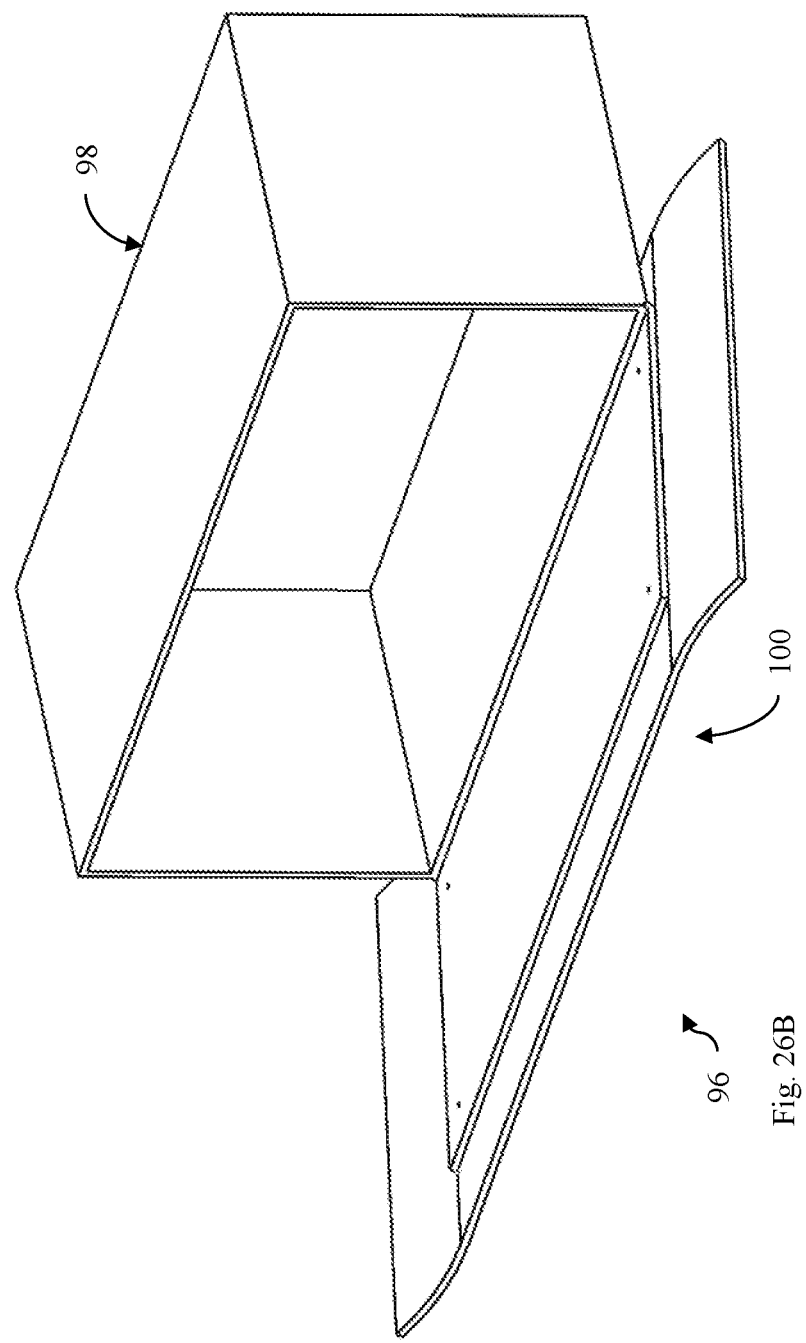
Figure 26C:
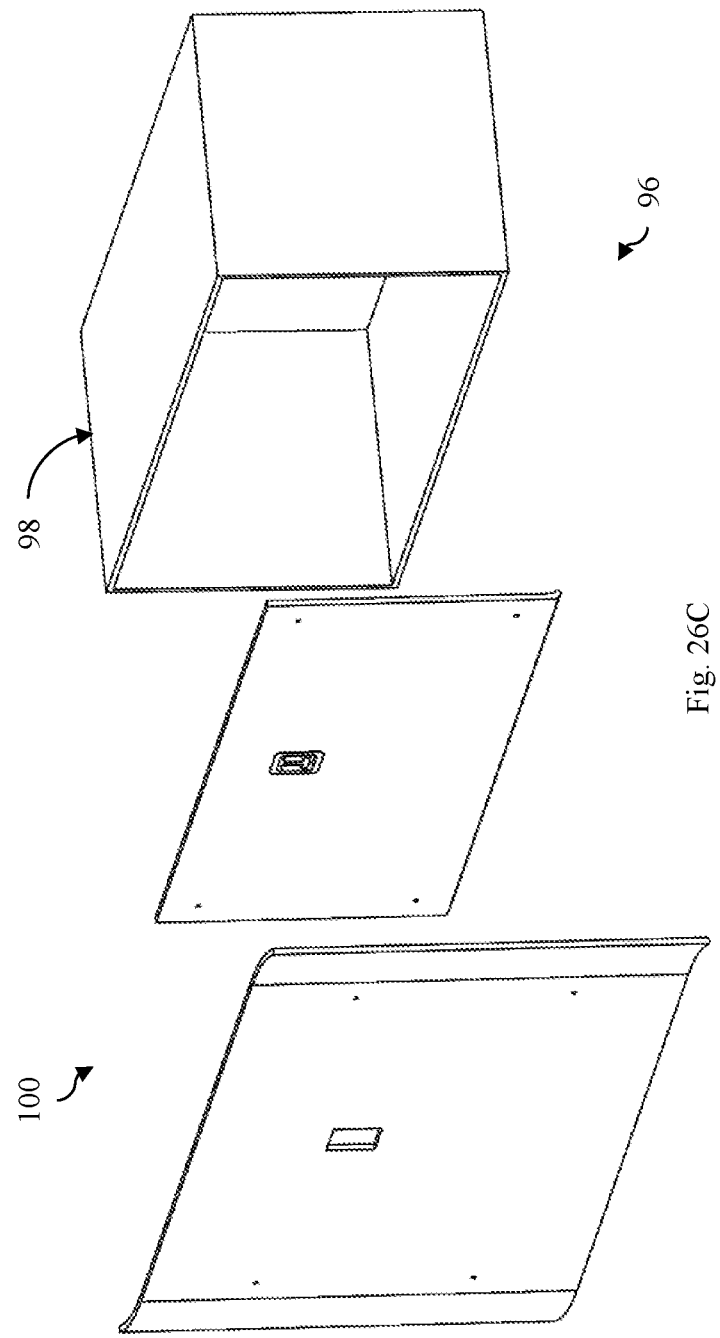
Figure 26D:
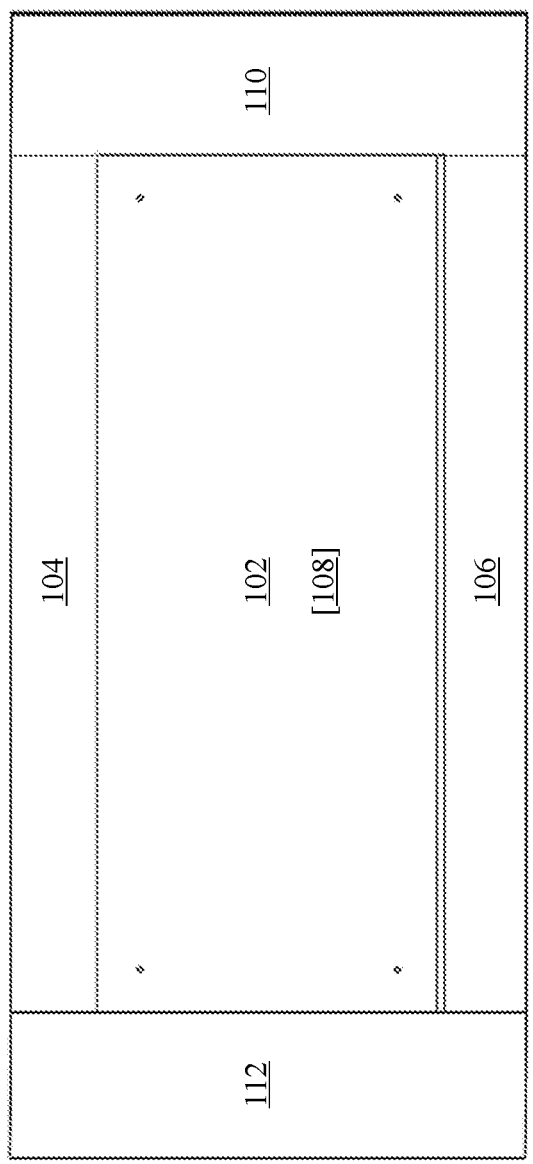

In the embodiment shown in FIG. 25, the aerodynamic toolbox assembly 80 comprises a toolbox 82 and an aerodynamic fairing facility 84. As can best be seen in FIG. 25C, the aerodynamic fairing facility 84 comprises an integrated front door panel 86, a top fairing panel 88, a bottom fairing panel 90, a first side fairing panel 92 and a second side fairing panel 94.

In the embodiment shown in FIG. 26, the aerodynamic toolbox assembly 96 comprises a toolbox 98 and an aerodynamic fairing facility 100. As can best be seen in FIG. 26C and FIG. 26D, the aerodynamic fairing facility 100 comprises a front door panel 102, a top fairing panel 104, a bottom fairing panel 106, a center fairing panel 108, a first side fairing panel 110 and a second side fairing panel 112.

Figure 27B:
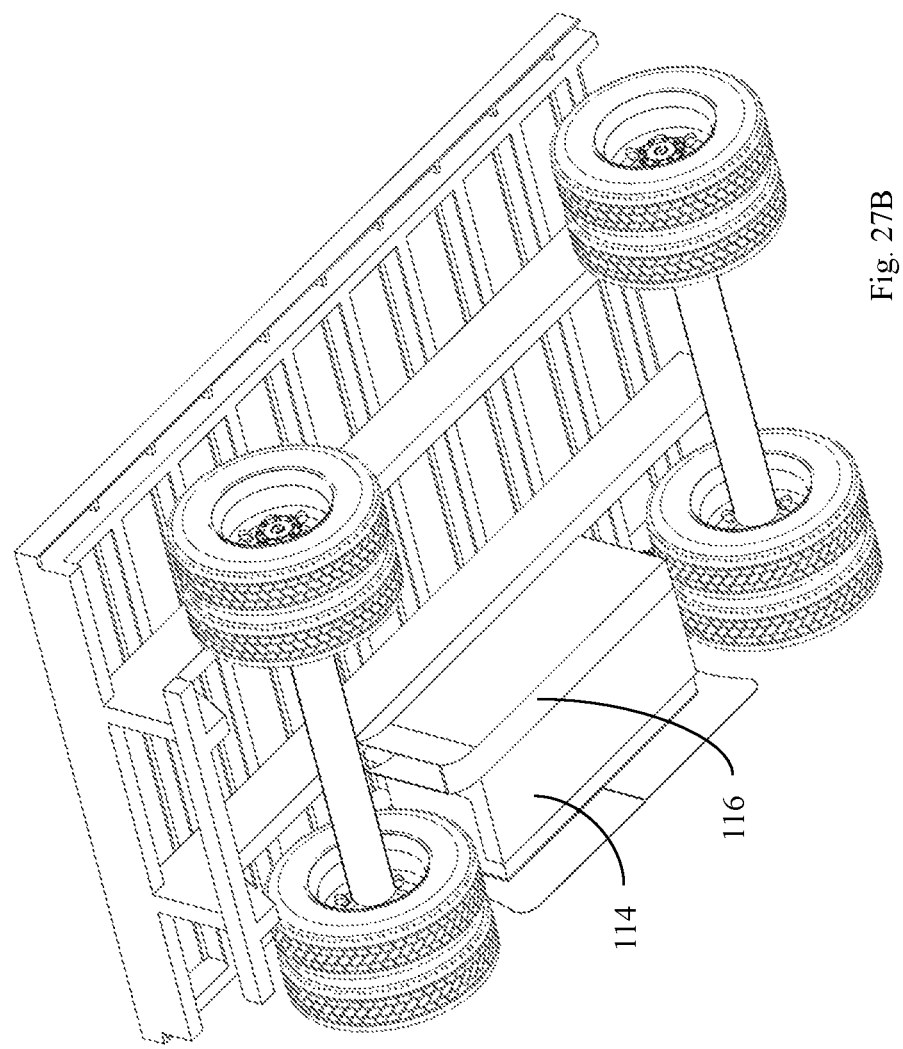
FIG. 27A and FIG. 27B, depicts a seventh embodiment of an aerodynamic toolbox.
Figure 27A:
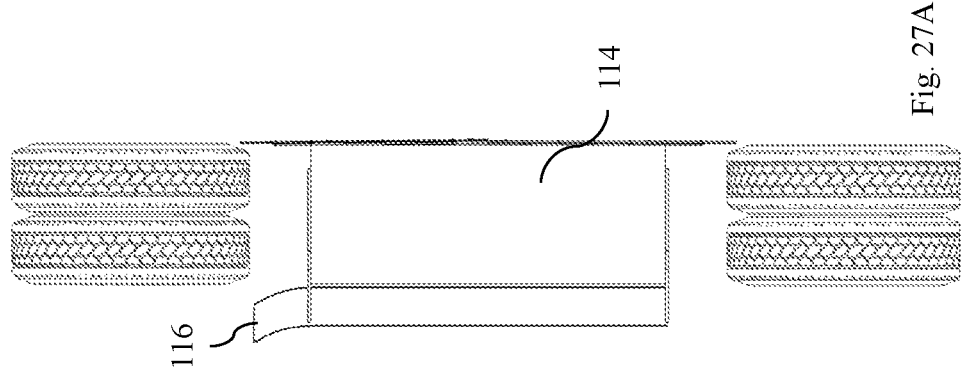
Figure 30D:
FIG. 30, comprising
Figure 30C:
Figure 30B:
Figure 30A:
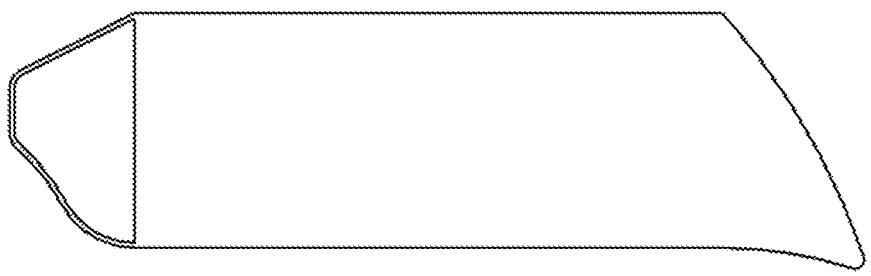

In the embodiment shown in FIG. 27, the toolbox 114 is configured with an aerodynamic fairing 116 comprising a passageway or duct behind the back panel of the toolbox 114. In this embodiment, this additional fairing 116 can be mounted to the frame of the vehicle and/or to the toolbox 114. As desired, the fairing 116 may be enclosed partially or completely. Further, the fairing 116 can be configured so that the air may be directed rearward and inward/outward/upward/downward. The fairing 116 may also be configured to direct cooling airflow to the vehicles brakes (not shown). Further, the fairing 116 may be configured to direct airflow outward, thereby to augment the airflow being deflected by the outside surface of the toolbox/rear fairing. The fairing 116 may also be located above or below the toolbox 114.

In the embodiment shown in FIG. 28, the toolbox 118 is configured with means for adjusting the length thereof, thereby providing a variable length aerodynamic toolbox assembly when combined with any of the several aerodynamic fairing configurations disclosed herein. In this embodiment, the toolbox 118 comprises first and second end portions, 120 and 122, respectively, and one center portion 124. Each of the end portions 120-122 overlaps the center portion 124 by a length which can be configured by the user when installing the toolbox 118. Alternatively, the center portion 124 could be eliminated, and the two end portions 120-122 may be configured to overlap each other thereby accomplishing the same purpose. The toolbox 118 could also be configured with a center portion 124 which couples directly to the end portions 120-122, wherein the center portion 124 comprises any of a plurality of different lengths. Other methods of providing adjustable or selectable length mechanical assemblies could be adapted to accomplish the same for the toolbox 118. One benefit of having an adjustable length toolbox 118 may include, for example, being able to maximize the surface area of the aerodynamic outer surface between the axles of a trailer, whereby the distance between the axles may vary widely. Another benefit of having an adjustable length toolbox 118 may be that fewer total parts are required to provide a plurality of desired lengths. A further benefit may be that the toolbox 118 requires less volume when being stored in a warehouse or when being shipped.

Shown in FIG. 29 is a front fairing panel 126 is pivotally coupled to a door 128 of an aerodynamic toolbox 130 via a hinge 132 (for clarity, shown only in FIG. 29A), thereby allowing rotation of the door 128 beyond 90° relative to front of the toolbox 130. In this embodiment, a latch hook 134 is configured to lock the fairing panel 126 in place when the door 128 is closed, thereby preventing wind force from making the fairing panel 126 rotate while the vehicle is in motion, while still allowing the fairing panel 126 to automatically move out of the way when the door 128 is fully opened. The hinge 132 may be, e.g., a spring hinge configured so that the fairing may return to its locked position when the door 128 is closed.

In the embodiment shown in FIG. 30, the toolbox 136 per se is configured to have an overall aerodynamic shape. In each of the several illustrated variants, additional storage space is obtained within the aerodynamically-shaped extensions of the toolbox 136.

Figure 24A:
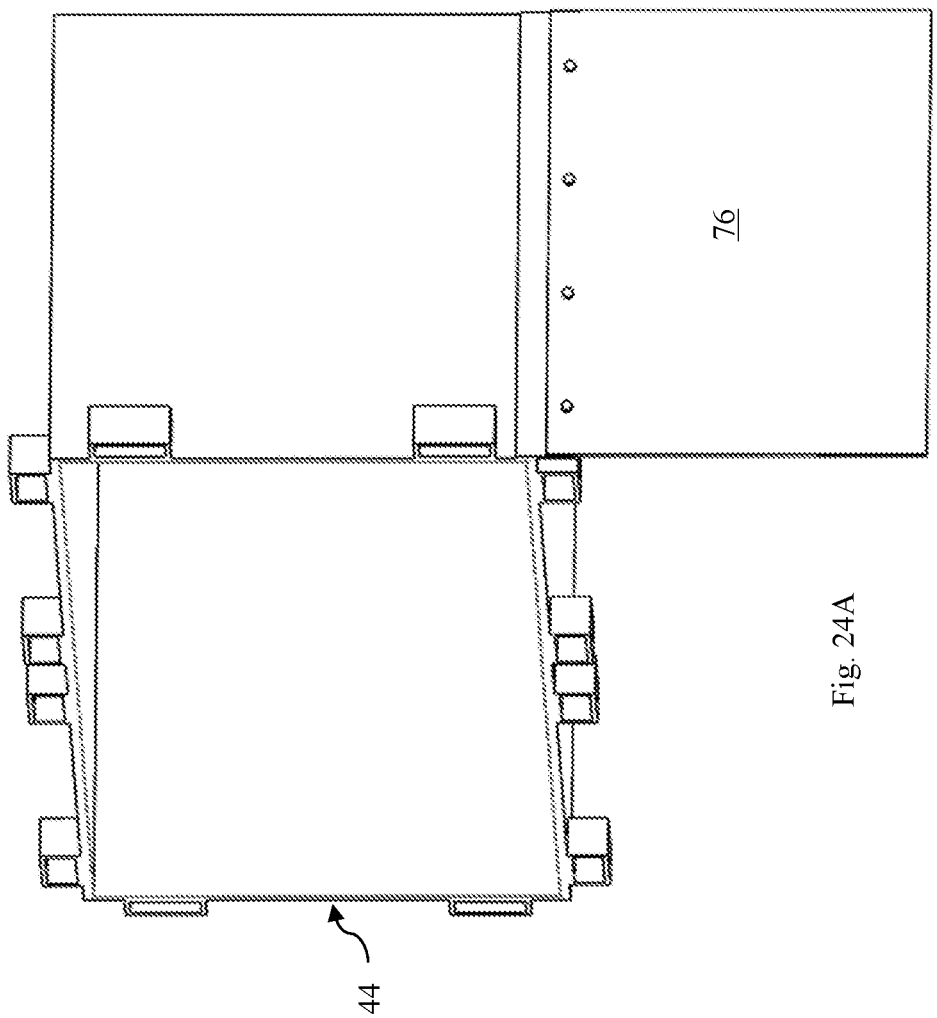

In the embodiment shown in FIG. 31, a plurality of aerodynamic toolbox assemblies 138, each similar in construction and arrangement to the embodiment of FIG. 24, are mounted adjacent to each other on the vehicle frame, and an inter-box fairing 140 is configured so as to cover the gap between each pair of toolboxes 138. In this embodiment, a top fairing panel 142 is coupled via a hinge (not shown) to the top edge of the inter-box fairing 140 (see, e.g., FIG. 3).

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

What we claim is:

1. An aerodynamic fairing system for use with a vehicle-mounted toolbox comprising:
   an aerodynamic fairing facility adapted to be coupled to a toolbox mounted to a vehicle, the toolbox comprising a front panel, a top panel, a bottom panel, a rear panel, a first side panel and a second side panel,
   the aerodynamic fairing facility comprising:
   a first fairing panel for coupling to a selected one of the top panel of the toolbox, the bottom panel of the toolbox, the first side panel of the toolbox and the second side panel of the toolbox, the first fairing panel being configured so as to: extend upward beyond the top panel of the toolbox and a top edge of the front panel along a vertical axis of the vehicle or extend downward beyond the bottom panel of the toolbox and a bottom edge of the front panel along the vertical axis of the vehicle.

2. The facility of claim 1 wherein the first fairing panel is further characterized as being pivotally coupled to a selected one of the top panel, the bottom panel, the first side panel and the second side panel, the first fairing panel being configured so as to extend beyond a selected one of the top panel, the bottom panel, the first panel and the second panel of the toolbox.

3. The facility of claim 1 wherein the first fairing panel is further characterized as being configured so as to extend beyond a selected plurality of the top panel, the bottom panel, the first panel and the second panel of the toolbox.

4. The facility of claim 1 wherein the first fairing panel is further characterized as comprising:
   a first front door panel; and
   a first fairing panel component coupled to the first front door panel, the first fairing panel component being configured so as to extend beyond a selected one of the top panel, the bottom panel, the first panel and the second panel of the toolbox.

5. The facility of claim 1 further comprising a second fairing panel pivotally coupled to a selected one of the top panel, the bottom panel, the first panel and the second panel, the second fairing panel being configured so as to extend beyond a selected one of the top panel, the bottom panel, the first panel and the second panel of the toolbox.

6. The facility of claim 5 wherein the first fairing panel is further characterized as being configured so as to extend beyond a selected plurality of the top panel, the bottom panel, the first panel and the second panel of the toolbox.

7. The facility of claim 6 wherein:
   the first fairing panel is further characterized as comprising:
   a first front door panel; and
   a first fairing panel component coupled to the first front door panel, the first fairing panel component being configured so as to extend beyond a selected one of the top panel, the bottom panel, the first panel and the second panel of the toolbox; and
   the second fairing panel is further characterized as comprising:
   a second front door panel; and
   a second fairing panel component coupled to the second front door panel, the second fairing panel component being configured so as to extend beyond a selected one of the top panel, the bottom panel, the first panel and the second panel of the toolbox.

8. The facility of claim 7 wherein:
   a first fairing panel coupled to the first front door panel configured so as to extend beyond a selected plurality of the top panel, the bottom panel, the first panel and the second panel of the toolbox; and
   a second fairing panel coupled to the first front door panel configured so as to extend beyond a selected plurality of the top panel, the bottom panel, the first panel and the second panel of the toolbox.

9. The facility of claim 1 wherein the toolbox is configured to be variable length.

10. The facility of claim 1 wherein:
    the selected toolbox panel is further characterized as comprising a receiver socket; and
    the first fairing panel is further characterized as comprising a plug configured to removably couple to the receiver socket by mating with the receiver socket.

11. The facility of claim 1 wherein the first fairing panel is further characterized as being contoured to direct airflow in a selected first direction with respect to a selected second direction of movement of the aerodynamic fairing facility.

12. The facility of claim 1 wherein the first fairing panel is further characterized as comprising:
    a first front door panel; and
    a first fairing panel component coupled to the first front door panel, the first fairing panel component being configured so as to extend beyond a selected one of the top panel, the bottom panel, the first panel and the second panel of the toolbox.

13. The facility of claim 1 wherein the dimensions of the first side panel and the second side panel are different.

14. The facility of claim 1 wherein a selected one of the first side panel and the second side panel of the toolbox is aerodynamically contoured to direct air flow.

15. The facility of claim 1 wherein a selected one of the first side panel and the second side panel comprises an aerodynamically-shaped extension of the toolbox.

* * * * *